(12) United States Patent
Straus et al.

(10) Patent No.: US 11,945,607 B2
(45) Date of Patent: Apr. 2, 2024

(54) VEHICLE CABIN CONDITIONING SYSTEM

(71) Applicant: Space Perspective Inc., Kennedy Space Center, FL (US)

(72) Inventors: John Straus, Kennedy Space Center, FL (US); Taber MacCallum, Kennedy Space Center, FL (US); Hector Santiago, Kennedy Space Center, FL (US); Tasneem Rashid, Kennedy Space Center, FL (US); John Zaniel Maccagnano, Kennedy Space Center, FL (US)

(73) Assignee: Space Perspective Inc., Kennedy Space Center, FL (US)

( * ) Notice: Subject to any disclaimer, the term of this patent is extended or adjusted under 35 U.S.C. 154(b) by 0 days.

(21) Appl. No.: 18/107,708

(22) Filed: Feb. 9, 2023

(65) Prior Publication Data
US 2023/0303270 A1    Sep. 28, 2023

Related U.S. Application Data

(60) Provisional application No. 63/338,379, filed on May 4, 2022, provisional application No. 63/308,335, filed on Feb. 9, 2022.

(51) Int. Cl.
*B64G 1/50*    (2006.01)

(52) U.S. Cl.
CPC ..................... *B64G 1/50* (2013.01)

(58) Field of Classification Search
CPC .......... B64G 1/50; B64D 13/08; B64D 13/06; B64D 13/02; B64D 13/006; B64D 2013/0618; B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | |
|---|---|---|---|
| 3,102,397 A | 9/1963 | Dante | |
| 3,285,514 A | 11/1966 | Smith | |
| 3,583,658 A * | 6/1971 | Herweg | B64D 13/08 62/243 |
| 4,238,095 A * | 12/1980 | Slater | B64B 1/66 244/26 |
| 4,430,867 A | 2/1984 | Warner | |

(Continued)

*Primary Examiner* — Gordon A Jones
(74) *Attorney, Agent, or Firm* — Jeffrey Schox

(57) ABSTRACT

The cabin conditioning system can include a cabin air loop, a refrigerant loop, and a set of thermal rejection components. The system can optionally include a phase-change fluid loop. However, the cabin conditioning system can additionally or alternatively include any other suitable set of components. The cabin conditioning system functions to condition a cabin interior (and/or an air volume therein) of a vehicle, such as an atmospheric and/or space-flight capsule. Additionally or alternatively, the system can function to reject heat from the vehicle interior and/or vehicle power systems (e.g., avionics components thereof). Additionally or alternatively, the system can function to maintain the humidity of air within the cabin interior. However, the cabin conditioning system can include any other suitable components.

24 Claims, 20 Drawing Sheets

(56) References Cited

U.S. PATENT DOCUMENTS

| | | | |
|---|---|---|---|
| 5,516,330 | A | 5/1996 | Dechow et al. |
| 5,701,755 | A | 12/1997 | Severson et al. |
| 9,617,005 | B1 * | 4/2017 | Schiff .................... B64D 13/00 |
| 11,230,384 | B2 | 1/2022 | Lynn et al. |
| 2010/0240290 | A1 | 9/2010 | Markwart et al. |
| 2015/0033782 | A1 * | 2/2015 | Kondo ............... B60H 1/00385 |
| | | | 62/244 |
| 2015/0284065 | A1 | 10/2015 | Maccallum et al. |
| 2016/0207376 | A1 * | 7/2016 | Sawyer .................. B60H 1/323 |
| 2018/0124953 | A1 * | 5/2018 | Engelhardt ........ H05K 7/20409 |
| 2018/0237141 | A1 * | 8/2018 | Heppe ...................... B64B 1/52 |
| 2021/0053689 | A1 * | 2/2021 | Lynn .................. H01M 10/617 |
| 2021/0331778 | A1 | 10/2021 | Farley et al. |

* cited by examiner

VEHICLE CABIN CONDITIONING SYSTEM

CROSS REFERENCE TO RELATED APPLICATIONS

This application claims the benefit of U.S. Provisional Application No. 63,338,379, filed 4 May 2022, and U.S. Provisional Application No. 63/308,335, filed 9 Feb. 2022, each of which is incorporated herein in its entirety by this reference.

TECHNICAL FIELD

This invention relates generally to the thermal management technology field, and more specifically to a new and useful cabin conditioning system and method in the thermal management technology field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
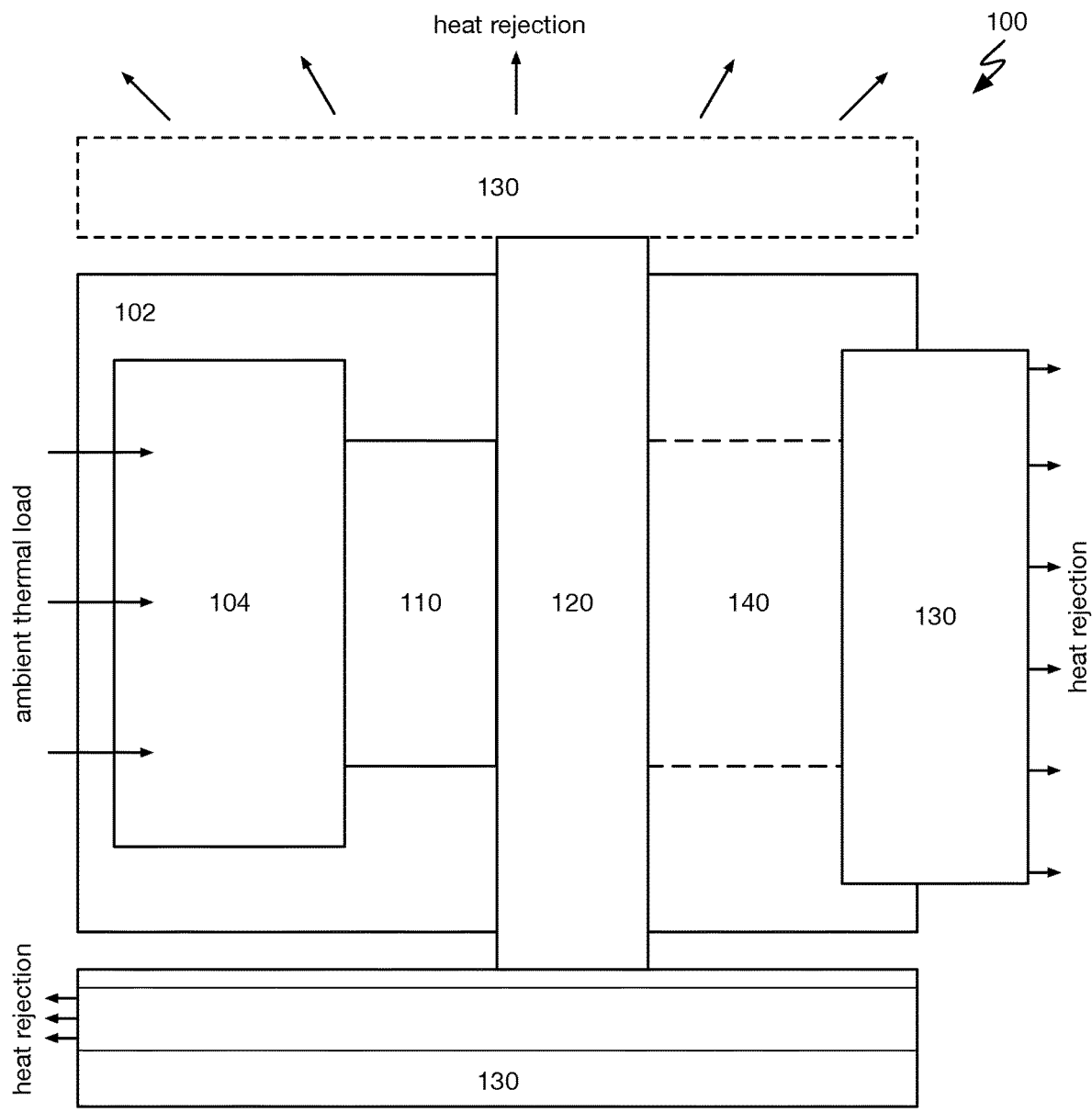
FIG. 1 is a schematic representation of a variant of the cabin conditioning system.

The cabin conditioning system 100, an example of which is shown in FIG. 1, can include a cabin air loop 110, a refrigerant loop 120, and a set of thermal rejection components 130. The system 100 can optionally include a phase-change fluid loop 140. However, the cabin conditioning system 100 can additionally or alternatively include any other suitable set of components. The cabin conditioning system functions to condition a cabin interior (and/or an air volume therein) of a vehicle, such as an atmospheric and/or space-flight capsule. Additionally or alternatively, the system can function to reject heat from the vehicle interior and/or vehicle power systems (e.g., avionics components thereof). Additionally or alternatively, the system can function to maintain the humidity of air within the cabin interior. However, the cabin conditioning system 100 can include any other suitable components.

Figure 2:
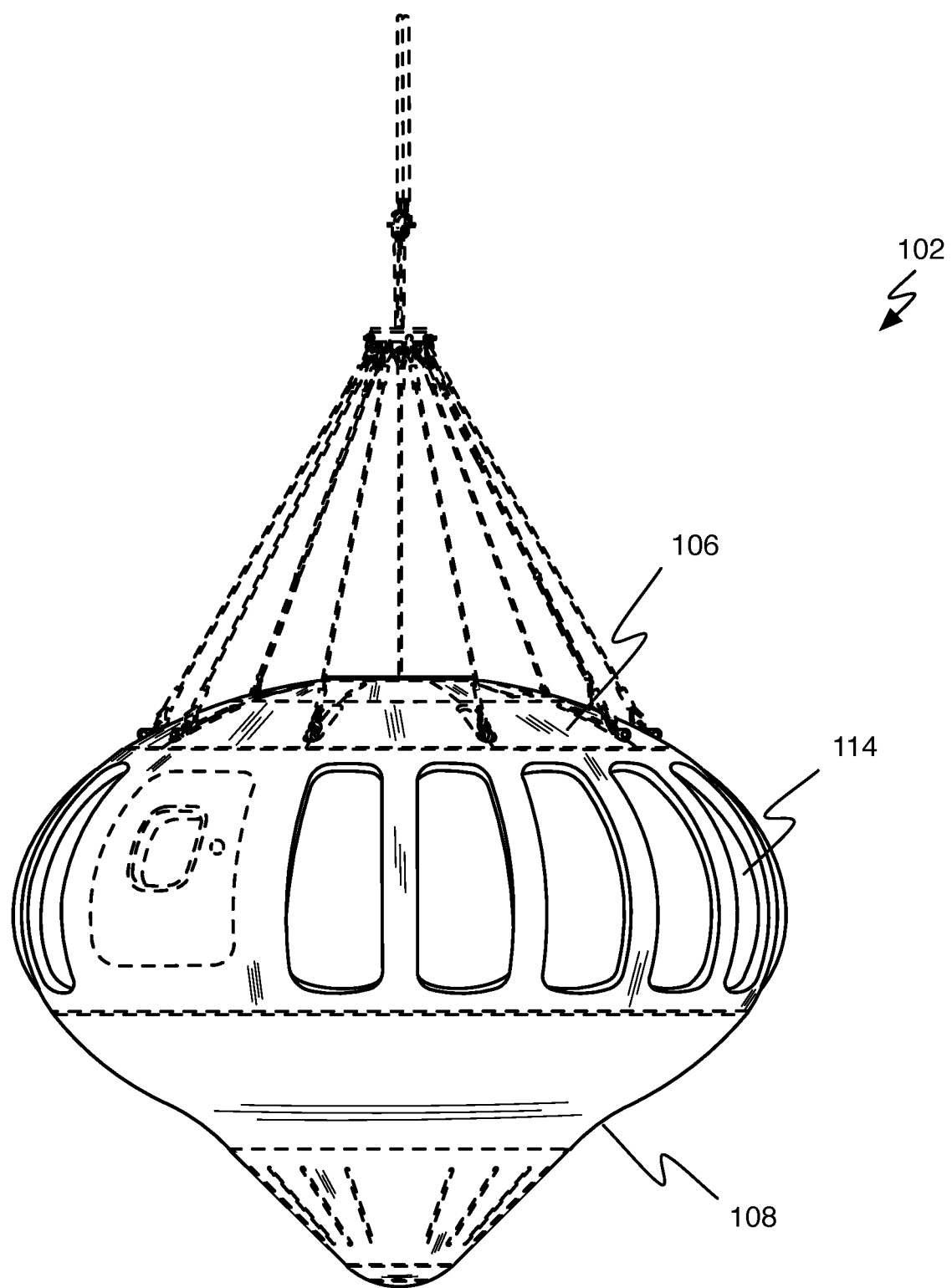
FIG. 2 is an example side view of a vehicle (capsule) in one or more variants of the cabin conditioning system.

The system is preferably integrated with a vehicle 102 (e.g., aerial vehicle, such as a balloon vehicle) and/or other enclosure, more preferably a vehicle or enclosure configured to contain one or more living occupants, such as human occupants, and the method is preferably employed for environmental control of the vehicle or enclosure with which the system is integrated. For example, the system and/or method can be configured to provide environmental control (e.g., heat rejection and/or dehumidification) for a pressure vessel capsule (e.g., an example is shown in FIG. 2) configured to transport human occupants to high altitudes (e.g., approximately 100,000 feet; from sea level). As an example, the system can be integrated into and/or used with a stratospheric balloon vessel configured to float within the stratosphere.

In some variants, the system, method, vehicle (e.g., aerial vehicle, such as a balloon vehicle) and/or enclosure in which the system and/or method are integrated and/or employed, and/or any other suitable elements thereof can include one or more aspects such as described in U.S. Provisional Application Ser. No. 62/969,447, filed 3 Feb. 2020 and titled "SPACE CAPSULE", U.S. patent application Ser. No. 17/160,837, filed 28 Jan. 2021 and titled "AEROSPACE VEHICLE SYSTEM AND METHOD OF OPERATION", U.S. patent application Ser. No. 17/162,151, filed 29 Jan. 2021 and titled "AEROSPACE BALLOON SYSTEM AND METHOD OF OPERATION", U.S. patent application Ser. No. 17/164,668, filed 1 Feb. 2021 and titled "AEROSPACE BALLOON SYSTEM AND METHOD OF OPERATION", and/or U.S. patent application Ser. No. 17/165,814, filed 2 Feb. 2021 and titled "AEROSPACE BALLOON SYSTEM, PARACHUTE, AND METHOD OF OPERATION", each of which is herein incorporated in its entirety by this reference.

In variants, the cabin conditioning system can additionally or alternatively be referenced as and/or integrated into an Environmental Control and Life Support System (ECLSS) for an aircraft, spacecraft, aerospace vessel, watercraft vessel, and/or any other suitable vehicle system.

1.1 Variants

The varied environmental conditions experienced during short duration stratospheric balloon flights can necessitate the use of one or more heat rejection techniques, such as radiation-based, convection-based, and/or phase-change-based techniques. At float altitude (e.g., approximately 100, 000 feet), and altitudes approaching and departing float, the atmosphere may be so thin that convection may not play a significant role in heat transfer. At low altitudes, where the pressure and temperature can be extreme, evaporation may be less effective. Radiator effectiveness and/or radiation-based heat rejection is typically reduced at lower altitudes. Typical environmental control systems may rely on water sublimation and/or flash evaporation. However, such phenomena may not be available at pressures below the triple point of water (approximately 611 Pa, corresponding to elevations above approximately 113,000 feet), which may not be reached for stratospheric flight at altitudes of approximately 100,000 feet or less; at a typical float altitude of approximately 100,000 feet, atmospheric pressure is typically too low for effective convective heat exchange, but too high for sublimation and/or flash-evaporation based technologies.

Variants of the system and/or method may rely on one or more of: phase change techniques such as water evaporation (e.g., pervaporation), and/or radiator-based techniques, such as those using radiative and/or convective heat transfer (at lower altitudes). Variants can additionally include desiccants for cabin air dehumidification. Additionally, variants can facilitate cabin air dehumidification at a cold (e.g., coldest) portion of a refrigeration loop (e.g., expansion valve) by chilling the cabin air below the dew point upon exposure and/or thermal contact.

In variants, water pervaporation (e.g., the phase change of liquid water to water vapor through a permeable membrane) can be used to reject heat for environmental control. In some examples of water pervaporation, the water can be cooled to a temperature near freezing (e.g., 0-10° C., such as 2-4° C.); however, at such temperatures, pervaporation is typically quite slow. Accordingly, it can be desirable to maintain (relatively) higher water temperatures at an inlet to facilitate a higher rate of heat rejection and/or a greater temperature drop across the permeable membrane (e.g., between inlet and outlet; corresponding to a larger net heat rejection).

In some radiator-based variants, at a typical float altitude of approximately 100,000 feet, atmospheric pressure is typically too low for effective convective heat exchange, but altitude is too low to arrange the radiator in a favorable radiative thermal environment for heat rejection (e.g., aimed toward low-temperature bodies). For example, on the top of the capsule, the sun may be shining down (e.g., at various times of day), and/or elements of the vehicle (e.g., balloon) may be blocking the view of deep space. On inferior (bottom) surfaces, upwelling infrared radiation from the Earth may reduce the effectiveness of a nadir-pointing radiator.

Variants which include water pervaporation and/or (radiative) radiator heat rejection, raising the temperature at which heat rejection occurs can increase heat rejection capabilities in various altitude ranges (e.g., a typical float altitude of approximately 100,000 feet; all altitude ranges). For water through a membrane, increasing the water temperature increases the water vapor pressure and thus the evaporation rate. For the radiator, increasing the temperature of the radiator increases the heat rejection rate per unit area of the radiator, thereby decreasing the required weight and area of the radiator. In examples, water evaporation and/or radiator-based approaches may be used separately and/or together.

In some variants, a heat pump (e.g., device that consumes energy to move energy from a cold region to a hot region; by way of a heat pump cycle and/or refrigeration cycle; a form of air conditioning; etc.) can be used to efficiently increase the temperature of water or radiator working fluid (e.g., to improve the efficiency of heat rejection). The working fluid of a heat pump is a refrigerant, the temperature of which is high enough downstream of the compressor to raise the temperature of the water in a pervaporation system or to radiate in a radiator system.

Various examples of water pervaporation-based systems are depicted in FIGS. 3-6. Various examples of radiator-based systems are depicted in FIG. 7, FIG. 8, and FIGS. 17-20. FIG. 9 depicts an example of a system including a water pervaporation element, a radiator element (e.g., "Top Cap Radiator") configured to operate in environments in which convection is negligible (e.g., stratospheric altitudes, higher altitudes), and a lower-altitude convective heat exchanger (e.g., "Sea HEX") configured to operate in environments in which convection is significant (e.g., low altitudes, submerged in terrestrial bodies of water such as the ocean, etc.).

The terms "radiator," "radiative radiator," "thermal radiator," and/or "spacecraft radiator" as utilized herein preferably refers to a component which rejects heat predominantly by a radiative (radiation emission) heat transfer mode, such as in a maximum thermal load case. For instance, greater than a threshold amount of heat rejected by a radiator may be rejected as radiation, such as greater than: 50%, 80%, 90%, 95%, 98%, 99%, 99.5%, and/or any other suitable fraction of heat rejection achieved by radiation emission (e.g., exactly 100%) in one or more thermal load cases (e.g., steady state at a maximum altitude, at a float altitude of 100,000 feet, etc.). "Radiators" as referenced herein are distinguished from convective heat exchangers (such as automotive heat exchangers, such as for engine cooling, which may be commonly referred to as "automotive radiators," "oil coolers," or the like) or convective heat sinks, whose primary mode of heat transfer is forced convection or free convection (and/or which rely upon a combination of radiation emission and convective heat transfer). For example, thermal fins or extended surfaces (extending orthogonal to a base plate) on a radiative radiator may have minimal effect on the heat rejection of a radiative radiator at float altitude (e.g., look feet, where the thin atmosphere results in minimal convective heat transfer), but may contribute significantly to natural/free convection at low altitudes (e.g., at sea level). Additionally or alternatively, the term radiator can be used to refer to a satellite or spacecraft radiator, and/or any other suitable radiation-based heat rejection system(s).

As an illustrative example, high emissivity coatings (e.g., emissivity of 0.5, 0.65, 0.75, 0.9, 0.95, 0.97, 0.98, 0.99, greater than 0.99, any range bounded by the aforementioned values, etc.) may increase the performance and net heat rejection for a radiative radiator. In contrast, such coatings may tend to reduce the convective performance of convective heat exchangers, typically as a result of the increased net thermal resistance; the majority of convective heat exchangers and heat sinks may be constructed from materials with thermal conductivities 50-1000+ times greater than that of high emissivity coatings (e.g., metals such as aluminum or copper), and are commonly uncoated or coated only with thin coatings (e.g., electroplated coatings such as anti-corrosion coatings) to minimize added thermal resistance arising from coatings.

As a second illustrative example, radiators can be used without thermal fins protruding perpendicular from an exterior broad face (e.g., wherein the presence of such thermal fins may disadvantageously increase the vehicle mass, while having minimal impact on the net heat rejection at float altitude).

However, the term "radiator" can be otherwise suitably used or relied upon herein.

1.2 Illustrative Example

In a first set of variants, a vehicle system can include: a pressure vessel capsule including: a superior surface at a first end, a structural frame comprising a set of support members extending between the first end and a second end, and a set of windows attached to the structural frame, each window extending between a respective pair of adjacent support members of the set, wherein the set of windows and the structural frame cooperatively define a cabin interior which is configured to be fluidly isolated from an exterior environment; a set of mounts at the superior surface of the pressure vessel configured to tether a lighter-than-air balloon to the pressure vessel capsule; a radiator mounted to the pressure vessel capsule, arranged outside the cabin interior and offset from the superior surface; a first heat exchanger mounted within the pressure vessel capsule; a cabin air loop, including: a cabin air manifold fluidly coupled to the first heat exchanger; and a fan configured to circulate the cabin air through the cabin air manifold; and a refrigerant loop including a refrigerant, the refrigerant loop configured to thermally couple the first heat exchanger and the radiator.

In a second set of variants, nonexclusive with the first set, a system for environmental conditioning of a pressurized cabin interior of a vehicle system includes: a pressure vessel capsule defining the cabin interior and housing cabin air within the cabin interior; a first heat exchanger mounted within the pressure vessel capsule; a cabin air loop, including: a cabin air manifold fluidly coupled to the first heat exchanger; and a fan configured to circulate the cabin air through the cabin air manifold; a radiator mounted to a superior surface of the pressure vessel capsule; and a refrigerant loop including a refrigerant, the refrigerant loop configured to thermally couple the first heat exchanger and the radiator.

2. Benefits

Variations of the technology can afford several benefits and/or advantages.

First, variations of this technology can condition and maintain a comfortable and/or healthy habitat for occupants, such as human occupants (e.g., 8 passengers and 1 pilot), under a variety of external environments (e.g., ambient conditions at sea-level and an altitude of about 100,000 feet). In variants, the steady state interior conditions can be maintained under varying external conditions for a duration of a vehicle trip (e.g., 6-10 hours). For example, variants can facilitate cabin conditioning with ambient temperatures which may fluctuate between −50 C and 45 C during a single flight (e.g., at various altitudes). As a second example, variants can facilitate environmental conditioning in absence of fluid communication between the cabin interior and the ambient surroundings (e.g., as may be impractical or undesirable at various altitudes; such as at float, where the ambient pressure may be about 10 millibars).

Second, variations of this technology can facilitate the use of large viewing windows in a vehicle, such as a spacecraft or stratospheric aircraft, which can offer superior, immersive viewing opportunities and an improved trip experience for vehicle occupants. In such cases, the incoming solar radiation and corresponding thermal load through the windows increases with the window size, which can be mitigated by the cabin conditioning system. In variants, solar-based thermal radiation may drive the majority of thermal load requirements for the system and/or the energy requirements for the vehicle. For instance, the energy requirements of environmental conditioning may overwhelmingly drive battery sizing and/or battery mass for the vehicle (e.g., the proportion of battery requirements and/or portion of battery power expenditure corresponding to environmental conditioning can be: greater than 50%, greater than 80%, greater than 95%, etc.).

Third, variations of this technology can minimize disturbances to cabin occupants which arise from maintaining the cabin environment, such as pervasive noise level (e.g., the noise is preferably maintained below a threshold value, such as 65 dBA, 60 dBA, 55 dBA, etc.), adverse temperature gradients, adverse airflow (e.g., air conditioning 'breeze' disturbing passenger hair with adverse photogenic effect, etc.), obstructions to a visual field (e.g., Earth horizon as observed through the window; condensation/dew formation on the windows; etc.), excess humidity (e.g., maintain humidity below a threshold humidity, such as below 50% humidity), and/or other cabin disturbances.

However, variations of the technology can additionally or alternately provide any other suitable benefits and/or advantages.

3. System

The cabin conditioning system 100, an example of which is shown in FIG. 1, can include a cabin air loop 110, a refrigerant loop 120, and a set of thermal rejection components 130. The system 100 can optionally include a phase-change fluid loop 140. However, the cabin conditioning system 100 can additionally or alternatively include any other suitable set of components. The cabin conditioning system functions to condition a cabin interior (and/or an air volume therein) of a vehicle 102, such as an atmospheric and/or space-flight capsule. Additionally or alternatively, the system can function to reject heat from the vehicle interior and/or vehicle power systems (e.g., avionics components thereof). Additionally or alternatively, the system can function to maintain the humidity of air within the cabin interior.

The cabin conditioning system 100 can include or be implemented in conjunction with a vehicle 102 which functions to facilitate vehicular transport via a cabin 104. Additionally or alternatively, the vehicle 102 can function to mount and/or operate in conjunction with a vehicle propulsion system (e.g., such as a zero-pressure balloon). The vehicle is preferably operable as and/or integrated with an aerospace vehicle (e.g., the capsule of a lighter-than-air vehicle), but can additionally or alternatively be an aircraft, watercraft, spacecraft, cargo-vehicle, (manned) passenger vehicle, unmanned vehicle, and/or any other suitable vehicle. In variants, the vehicle can be the vehicle and/or capsule as described in U.S. patent application Ser. No. 17/160,837, filed 28 Jan. 2021 and titled "AEROSPACE VEHICLE SYSTEM AND METHOD OF OPERATION", U.S. patent application Ser. No. 17/162,151, filed 29 Jan. 2021 and titled "AEROSPACE BALLOON SYSTEM AND METHOD OF OPERATION", U.S. patent application Ser. No. 17/164,668, filed 1 Feb. 2021 and titled "AEROSPACE BALLOON SYSTEM AND METHOD OF OPERATION", and/or U.S. patent application Ser. No. 17/165,814, filed 2 Feb. 2021 and titled "AEROSPACE BALLOON SYSTEM, PARACHUTE, AND METHOD OF OPERATION", each of which is herein incorporated in its entirety by this reference. In an example, the vehicle can be a stratospheric balloon vessel configured to float within the stratosphere. In a second example, the vehicle can be a pressure vessel capsule which includes a set of mounts at the superior surface of the pressure vessel, the set of mounts configured to tether a lighter-than-air balloon to the pressure vessel capsule.

Figure 12:
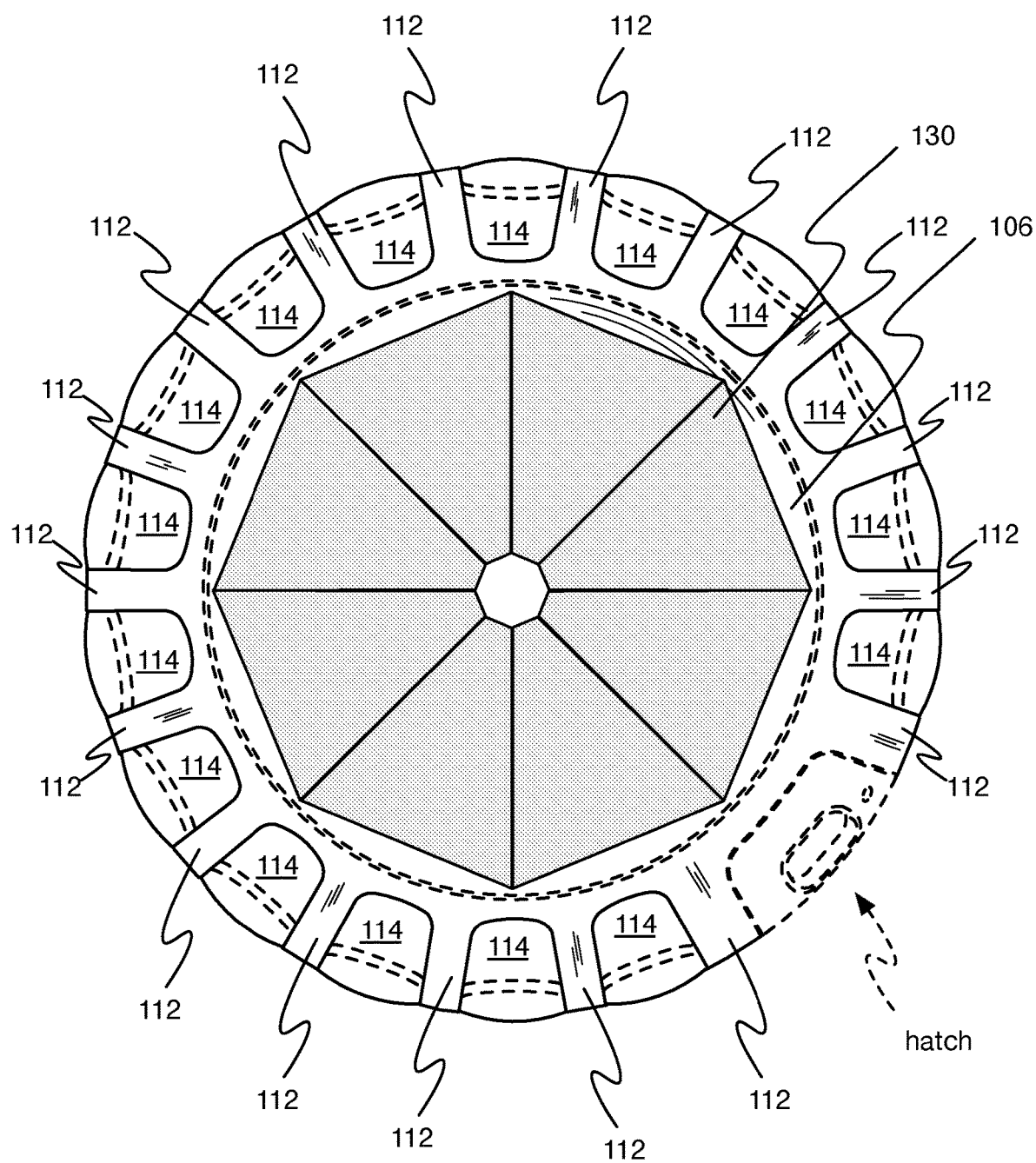
FIG. 12 is a top view of an example arrangement of a radiator in a variant of the cabin conditioning system.

The vehicle can be substantially rotationally symmetric (e.g., about a primary axis of the vehicle and/or stabilizer), but can additionally or alternatively be asymmetric, include asymmetric features (e.g., a hatch; an example is shown in FIG. 12), and/or can be otherwise configured. The vehicle can include or define a vehicle platform (e.g., deck, mounting platform for the human supports, etc.), which is orthogonal to a primary (vertical) axis of the vehicle. However, the vehicle can be otherwise configured.

The vehicle 102 can optionally include a cabin 104. The cabin can function to carry occupants (e.g., living humans) within the vehicle and may maintain environmental conditions for occupant health, safety, and/or comfort. The cabin is preferably arranged within the vehicle interior, such as within a pressure vessel interior (e.g., wherein the pressure vessel maintains a breathable atmosphere inside the pressure vessel interior, even in low-pressure environments unsuitable for sustaining human life). As an example, the vehicle 102 can include a pressure vessel capsule configured to maintain pressurization within the cabin interior while fluidly isolating the cabin interior from the surrounding environment. The cabin can include one or more human supports (e.g., seats). Each human support is preferably configured to orient a human occupant (e.g., the face and/or eyes of the occupant) toward a window of the pressure vessel (e.g., toward the window closest to the human support). For example, each human support can be arranged between a central axis of the pressure vessel and a window (preferably a different window for each human support). In this example, the human supports (e.g., seats) are preferably arranged facing the respective window with which they are aligned, but can additionally or alternatively have any other suitable arrangement (e.g., with the seats misaligned from the windows, leaving room for occupants to stand facing a window, etc.). In a specific example, the cabin includes a set of seats arranged around the cabin (e.g., regularly spaced around the cabin). In this specific example, each seat is preferably arranged (e.g., mechanically secured to the capsule, such as to a floor of the cabin) near and facing toward a different window of the pressure vessel.

However, the human supports can additionally or alternatively have any other suitable functionality and/or arrangement, and/or the cabin can additionally or alternatively include any other suitable elements in any suitable arrangement.

The vehicle 102 can include a set of windows 114 (e.g., which may provide occupants, sealed within the pressurized cabin interior, the opportunity to visually observe the surrounding environment). As an example, each window may extend between a respective pair of adjacent support members of the vehicle (e.g., the support members forming a structural frame of the vehicle), wherein the set of windows and the structural frame cooperatively define a cabin interior which is configured to be fluidly isolated from an exterior environment. Additionally, the set of windows may provide a net positive heat load on the system as a result of incoming (solar) radiation. The windows are preferably large viewing windows (e.g., broader than a human frame, dimensions exceeding median stature human height and/or shoulder breadth, etc.), such as the windows described in U.S. patent application Ser. No. 17/160,837, filed 28 Jan. 2021 and titled "AEROSPACE VEHICLE SYSTEM AND METHOD OF OPERATION," which is incorporated herein in its entirety by this reference. The exterior window area (e.g., surface area in contact with ambient surroundings) of each window can be: less than 0.5 square meters, 0.5 square meters, 0.75 square meters, 1 square meter, 1.5 square meters, 2 square meters, greater than 2 square meters, any range bounded by the aforementioned values, and/or any other suitable window area. The net exterior window area (e.g., across all windows of the set) can be: less than 5 square meters, 5 square meters, 10 square meters, 15 square meters, 20 square meters, 25 square meters, 50 square meters, greater than 50 square meters, any open or closed range bounded by the aforementioned values, and/or any other suitable exterior window area.

Windows are preferably single-walled (e.g., which may improve optical performance and/or reduce distortion), but can alternatively be double-walled, and/or otherwise implemented. Windows can be constructed of glass, polycarbonate, and/or any other suitable window substrate(s), with any suitable coatings/film(s).

In variants, windows can include or be implemented with coatings, films, tints, spectral filters, and/or other treatments/coatings to reduce transmission of (radiant) energy through the windows. Windows can include UV films/filters (e.g., polyethylene terephthalate [PET] film), low emissivity (or low-emittance) coatings, insulated glazing, polarizing tints, and/or any other suitable treatments, coatings, or other features to reduce thermal transmission through the windows. As an example, UV coatings can be configured to reduce (solar) UV radiation transmission through the window by: less than 50%, 50%, 80%, 90%, 95%, 98%, 99%, 99.5%, 99.9%, greater than 99.9%, any open or closed range bounded by the aforementioned values, and/or can block any other suitable amount of UV radiation transmission through the windows. Alternatively, windows may be uncoated and/or untreated, and/or can be otherwise implemented.

However, the vehicle can include any other suitable windows.

Figure 10:
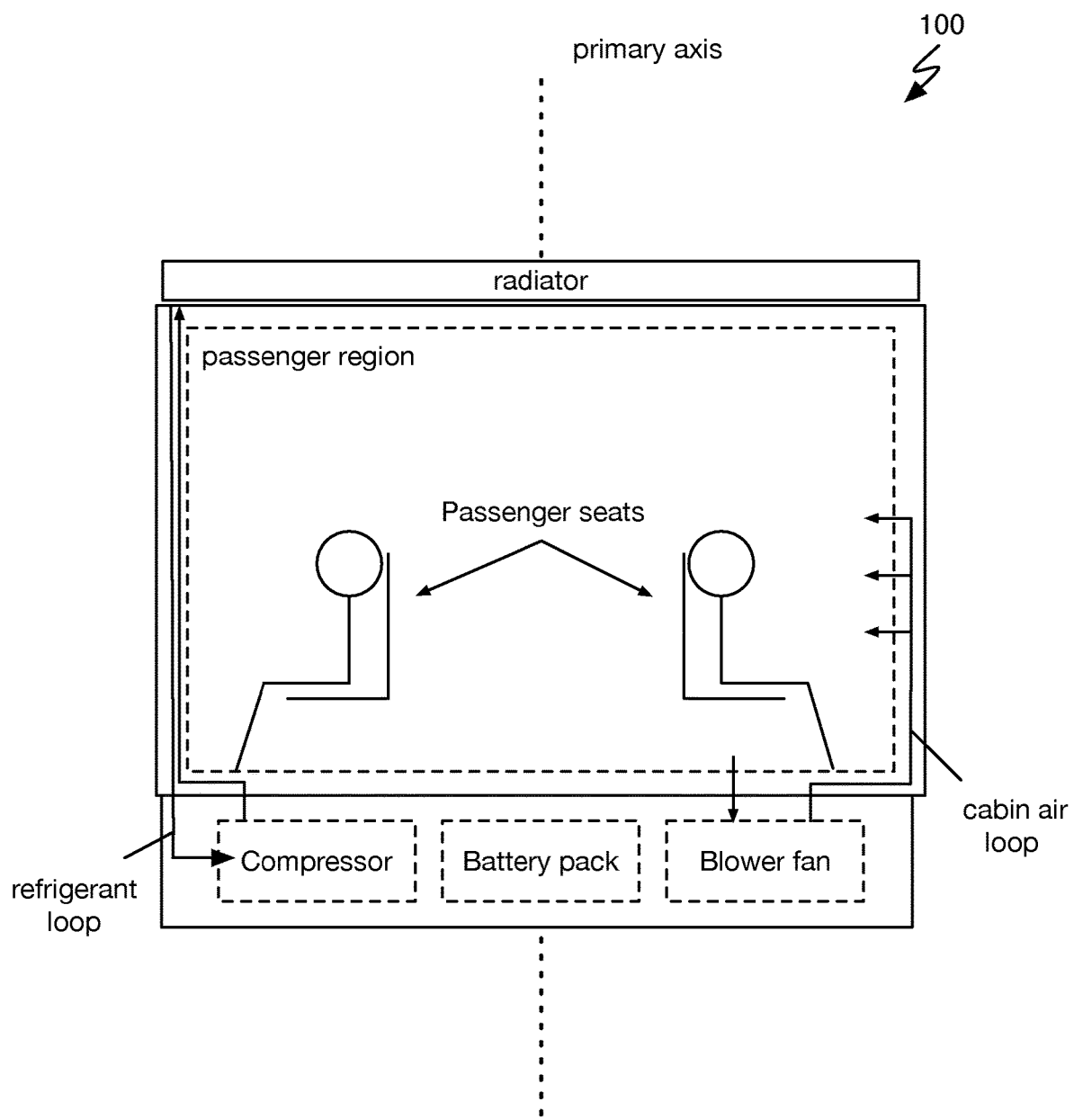
FIG. 10 is a schematic diagram illustrating an example cabin conditioning system.
Figure 14:
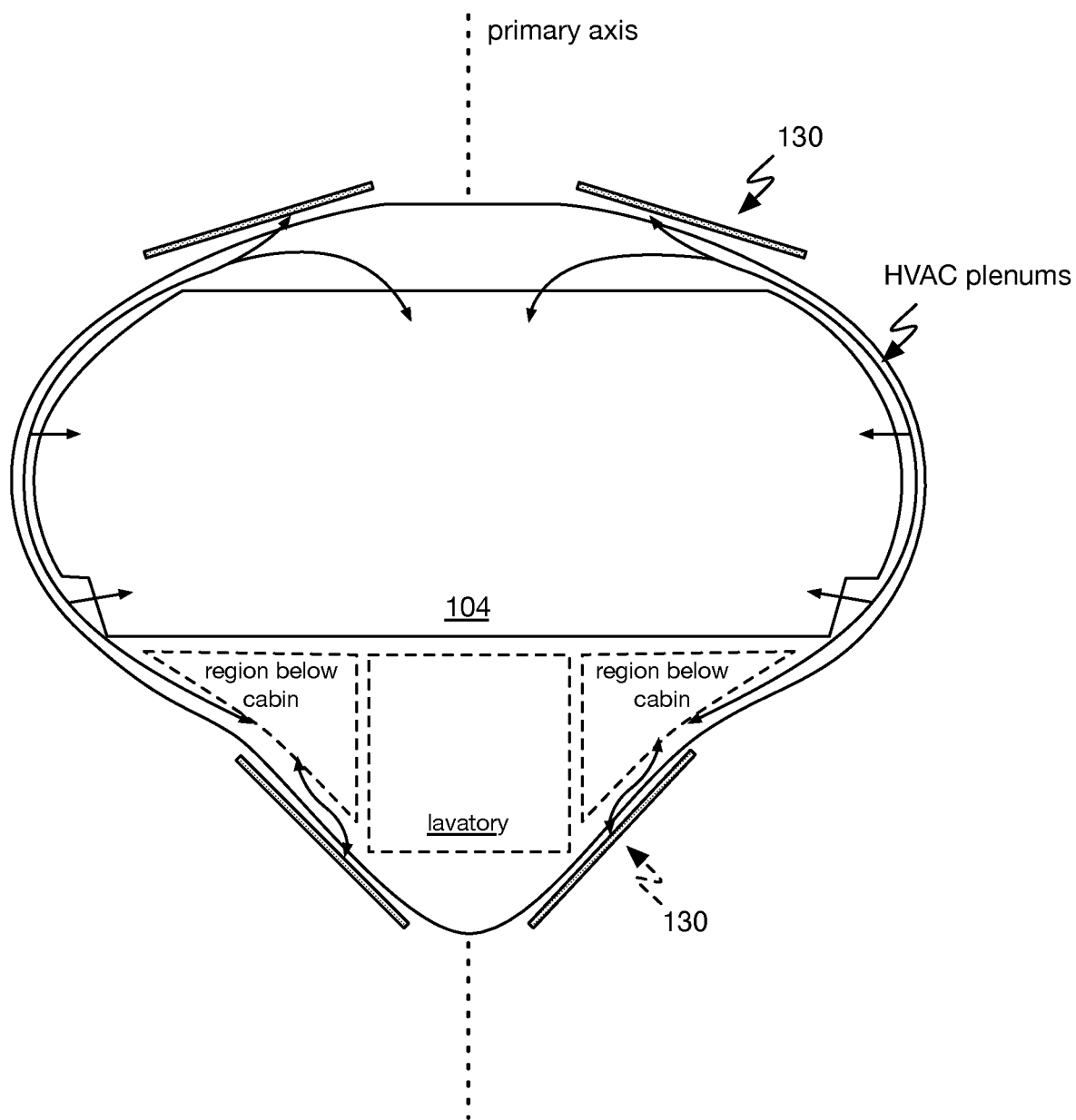
FIG. 14 is a partial side view of an example cross section illustrating HVAC routing between components in a variant of the cabin conditioning system.

The vehicle 102 can include a set of support members 112 (a.k.a., support ribs) which span a vertical extent of the windows and/or support the vessel between opposing ends (e.g., carrying forces/moments, without transmitting structural loads through the windows). Additionally, the support members can facilitate routing of HVAC components and/or fluids between the ends of the vehicle (e.g., an example is shown in FIG. 10; a second example is shown in FIG. 14). The support members are preferably interdigitated between windows, radially encircling the cabin and/or the primary axis of the vehicle, but can additionally or alternatively extend above and below windows (e.g., framing each window), surround a hatch or other asymmetric vehicle features, and/or can be otherwise arranged to structurally support the vehicle. As an example, the support members can extend meridionally between a first vehicle end (e.g., proximal the apex and/or top-cap radiator; including a superior surface 106) and a second vehicle end (e.g., proximal the nadir; including an inferior surface 108).

The support members are preferably formed as a hollow-bodied composite structure, such as carbon fiber or fiberglass, but can be otherwise constructed via metals (e.g., metal alloys such as aluminum, titanium, steel, etc.), plastic polymers, and/or any other suitable materials. In variants, the support members can each define one or more channels or plenums within the hollow interior, which can be directly integrated with a cabin air manifold and used to duct cabin air throughout the vehicle. Additionally or alternatively, plenums can house fluid manifolds for the refrigerant and/or cabin air loops, to route fluids from components housed below the cabin/deck to the upper end of the vessel (e.g., top-cap radiator). Plenums can be insulated, partially insulated, uninsulated, and/or otherwise integrated. Plenums can optionally include orifices/holes (e.g., drilled, formed as part of a layup, etc.) which fluidly couple the hollow interior of the supports to the cabin interior, and can function as cabin air intakes and/or cabin air outlets. For example, an array of vent holes along the length of a support can direct conditioned cabin air laterally across the interior of a window. Additionally or alternatively, cabin air can be ducted (e.g., through the supports and/or a separate manifold) above the window(s) and vented downward from above the window and/or ducted (e.g., through the support members and/or a separate manifold) below the windows and vented upward from below the window(s).

In a first example, each support member of the set is a composite plenum which is integrated into a cabin air manifold (e.g., as an element of the cabin air loop 110).

However, the vehicle 102 can include any other suitable support members and/or structural elements.

However, the cabin conditioning system can include or be used with any other suitable vehicle(s).

The cabin air loop 110 functions to circulate (conditioned) air within the interior of the cabin 104. Additionally or alternatively, the cabin air loop functions to draw humidity out of the cabin air. Additionally or alternatively, the cabin air loop functions to facilitate heat transfer between the cabin and/or and the set of thermal rejection components 130 (e.g., via the refrigerant loop 120; in a cooling mode; etc.).

The cabin air loop and/or components thereof can be arranged within the walls of the cabin (e.g., within support members and/or a plenum thereof), above the cabin (e.g., at a first end of the vehicle proximal to a superior surface and/or top-cap radiator, etc.), below the cabin deck and/or passenger supports, any combination thereof, and/or can be otherwise arranged. Likewise, air inlets (e.g., cabin interior intakes) and/or outlets (e.g., cabin interior vents) are preferably distributed throughout the cabin interior (e.g., walls, upper surfaces near ceiling, beneath floor/seats, etc.), but can alternatively be centralized (e.g., central conditioning console, etc.) and/or can be otherwise arranged/distributed.

The cabin air loop can include one or more air manifolds and a set of fans—such as blower fans or ducted fans—which route cabin air from between an inlet(s) and an outlet(s) of the air manifold. Between the inlet(s) and outlet(s) air manifold can route air through/across various conditioning and/or heat transfer components, which can include: heat exchangers (e.g., fluid-air heat exchangers, condenser of the refrigerant loop, evaporator of the refrigerant loop, etc.), heating elements (e.g., resistive heater, electric heater), desiccant filters, air filters (e.g., HEPA filter), valves (e.g., air flow valves; air can be routed across or adjacent to an expansion valve of a refrigerant loop, etc.), internal ducting, and/or any other suitable components. Components can be arranged in any suitable combination and/or permutation of series and/or parallel within a cabin air loop (or sub-loops thereof), and/or may be selectively reconfigured in one or more configurations of the cabin conditioning system (e.g., heating mode, cooling mode, etc.).

In one set of variants, the geometry of vehicle support structures (e.g., meridional supports between windows) may form part of the air manifold of the cabin air loop. For example, plenums within the double-walled and/or hollow-bodied support members may route the cabin air meridionally, through the walls of the cabin and/or between the windows. In such variants, cabin air can be vented from the supports (e.g., via an array of orifices) across the windows. For example, cabin air can be vented substantially perpendicular to the window frame, substantially towards a window midpoint, substantially towards an opposing edge of the window, and/or orthogonal to a support structure. For instance, the support structures can include an array of orifices above a window (e.g., along a top edge), below a window (e.g., along a bottom edge), adjacent to a window (e.g., laterally, vertically), along a meridional edge of the window, and/or along an interior surface/side of the window (e.g., a concave surface, a planar surface, etc.). In such variants, air venting proximal to windows may facilitate window defogging/defrosting (e.g., where vented air may be dehumidified) and/or to inhibit water condensation on the window. As an example, a cold (e.g., coldest) point/region of the air manifold may be at the body of an expansion valve of the refrigeration loop (e.g., where the interior of the window is at a higher temperature than the expansion valve). As a second example, the cabin air may be cooled and/or routed through a dehumidifier/dryer within the cabin air loop prior to venting along an edge of a window. In a third example, the cabin air circulated through the cabin air loop is at least partially dehumidified, within the cabin air loop, at an exterior of an expansion valve of the refrigerant loop or at a desiccant filter. However, cabin air may alternatively be vented/circulated elsewhere within the cabin, with or without venting along the windows, and/or the windows may be otherwise conditioned (e.g., heated and/or cooled), dehumidified, and/or defogged (e.g., manually, via resistive heating, etc.).

Fans which circulate air through the air loop can include: centrifugal fans, cross flow fans, axial flow, blower fans, air movers, impeller, air compressors, and/or any other suitable fan types. Fans are preferably ducted through the interior of the air manifold, but can alternately be unenclosed (e.g., operated without fan shroud). Fans can have any suitable arrangement within the air loop, and can be arranged in series along a single air flow path (e.g., through the exterior air inlet and/or outlet) and/or in parallel along separate (e.g., adjacent, redundant) ducts or airflow paths. Fans are preferably configured to circulate air while operating below a threshold noise level (e.g., below a threshold value, such as 70 dBA, 65 dBA, 60 dBA, 55 dBA, etc.), but can be otherwise configured. In variants, fans can optionally be separated from the cabin interior and/or cabin occupants by sound dampening materials, insulation, and/or other sound-proofing equipment, and/or any other noise-reduction components can be arranged proximal to the fan(s) of the cabin air loop. In variants, the fans can be implemented with dual or triple redundancy (e.g., in series and/or parallel), which may facilitate persistent cabin air circulation in the event of one or more fan failures. However, the cabin air loop (and/or one or more fluid channel/duct thereof) can alternatively be implemented with a unitary fan, and/or the cabin air loop can be otherwise configured.

The fan(s) of the cabin air loop can be configured to individually and/or collectively provide air circulation at a rate of: less than 100 CFM, 100 CFM, 200 CFM, 400 CFM 600 CFM, 800 CFM, 1200 CFM, greater than 1200 CFM, and/or any other suitable rate of air movement/circulation. In a specific example, for a cabin conditioning system with a capacity of about 3.5 kW of cooling power, the fan(s) can be configured to circulate the cabin air through the cabin loop at a rate of about 400 CFM.

The cabin air (and/or cabin air loop) is preferably fluidly isolated from an exterior environment (e.g., in the case where the vehicle is a pressure vessel capsule, etc.), but can alternatively be selectively fluidly coupled to the exterior environment in one or more configurations (e.g., when a hatch/door is opened, air exchange with surroundings in low Earth atmosphere and/or near sea level, etc.).

In variants, the cabin air loops can optionally be used to provide active cooling to avionics components and/or batteries (e.g., air ducted across a battery or avionics heat sink, etc.), such that the heat load from these components is absorbed and/or rejected by the cabin conditioning system. For example, avionics equipment and/or batteries may heat the cabin air, wherein the cabin air may be cooled via the cooling power of the cabin conditioning system (e.g., refrigeration loop thereof). However, avionics components and/or batteries can alternatively be separately cooled.

In variants, the cabin air loop can additionally or alternatively include and/or operate in conjunction with: a trace contaminant control (TCC) system, a pressure maintenance system, an air/oxygen supply (e.g., oxygen tank), an auxiliary oxygen supply (e.g., oxygen mask system), and/or any other suitable ECLSS subsystems or components. However, the cabin air loop can be otherwise configured or deployed in any other suitable vehicle contexts.

However, the system can include any other suitable air loop(s).

The refrigerant loop 120 functions to transfer thermal energy between cabin air within the cabin air loop 110 and the set of thermal rejection components 130 (e.g., directly, indirectly by way of a phase change fluid within a phase-change fluid loop 140, etc.) by way of a thermodynamic cycle (e.g., heat pump cycle, refrigeration cycle, etc.). Additionally, the refrigerant loop can function to condense water vapor in the cabin air (e.g., at a TXV) to dehumidify the cabin air. The refrigerant loop preferably operates as a refrigeration system and/or fluid chiller. Additionally or alternatively, the refrigerant loop can be configured to operate as a heat pump, such as a single stage heat pump, multi-stage heat pump, reversible heat pump, and/or any other suitable heat pump. The refrigerant loop preferably includes: a refrigerant, at least two heat exchangers (e.g., one or more evaporator and one or more condenser), one or more expansion valves (e.g., a thermal expansion valve [TXV], electronic expansion valve, etc.), one or more compressors, and/or any other suitable components. The refrigerant loop can optionally include a low ambient control (LAC) valve (e.g., head pressure control valve; along with a LAC refrigeration circuit/line), a crankcase heater, a flash chamber, a filter drier, switching valves (e.g., 3 way switching valves, 4 ways switching valves, etc.), receivers, freezestats, accumulators, and/or any other suitable components. Additionally, the refrigeration loop can optionally include or be used with: time-delay functions on low pressure control, a thermostatically controlled heater(s) for the receiver (or another portion[s] of the refrigeration loop), receiver insulation, a steel-bladed condenser fan(s), a low-temperature motor(s) (e.g., compressor motor, etc.), and/or any other suitable low-temperature components or low ambient control (LAC) modifications.

In variants, the refrigeration loop may be configured to cool the cabin interior (e.g., which may be fluidly isolated from the ambient surroundings) under ambient conditions below freezing (e.g., −50 degrees Celsius). As an example, the refrigeration loop may operate in a cooling mode proximal to the tropopause (e.g., at about 60,000 feet). In such variants, the refrigeration loop may rely on low ambient controls and/or a low ambient control valve to facilitate operation in such low-temperature ambient environments.

Figure 17:
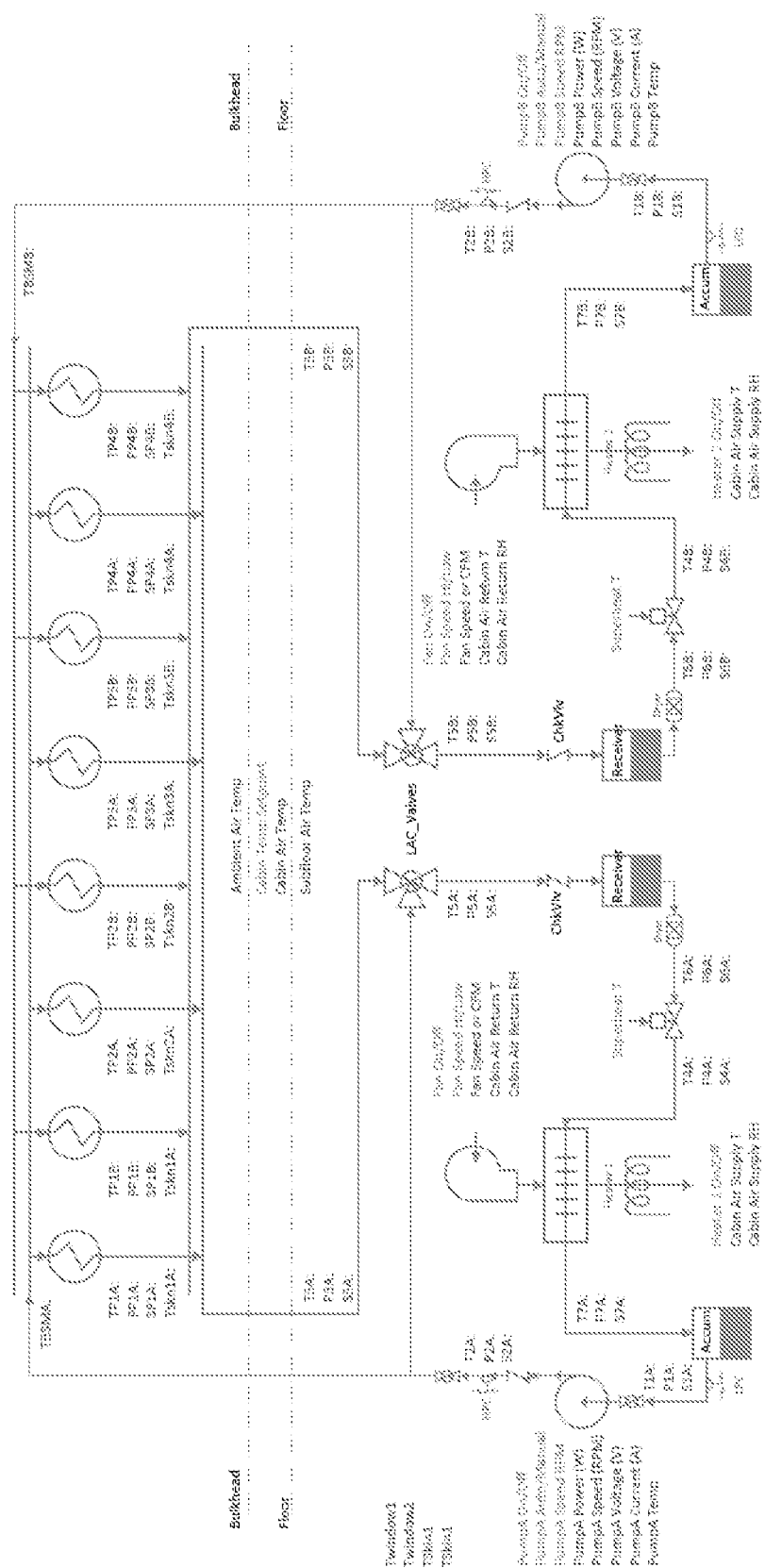
FIG. 17 is a schematic diagram of a variant of the cabin conditioning system.
Figure 18:
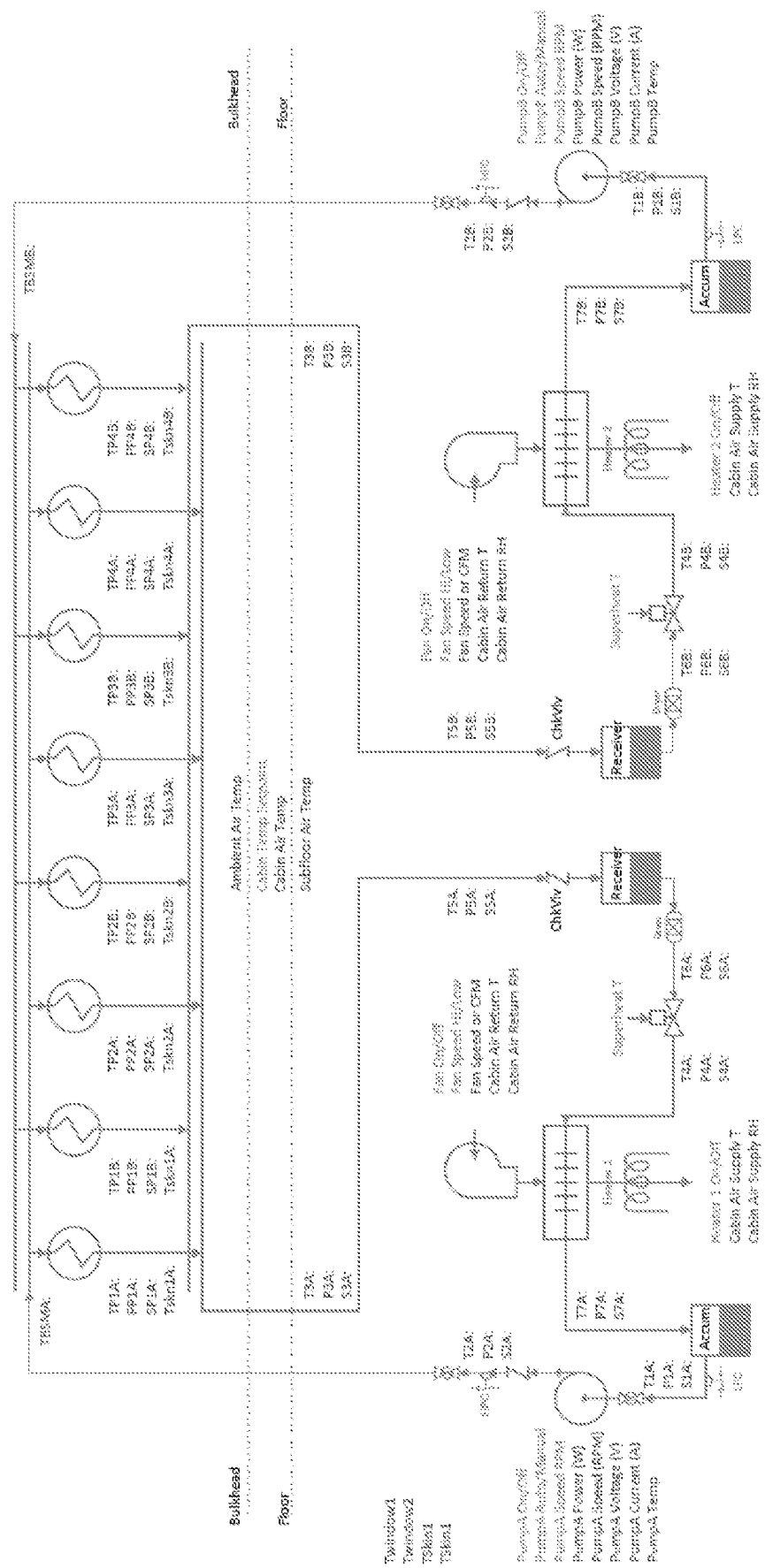
FIG. 18 is a schematic diagram of a variant of the cabin conditioning system.
Figure 19:
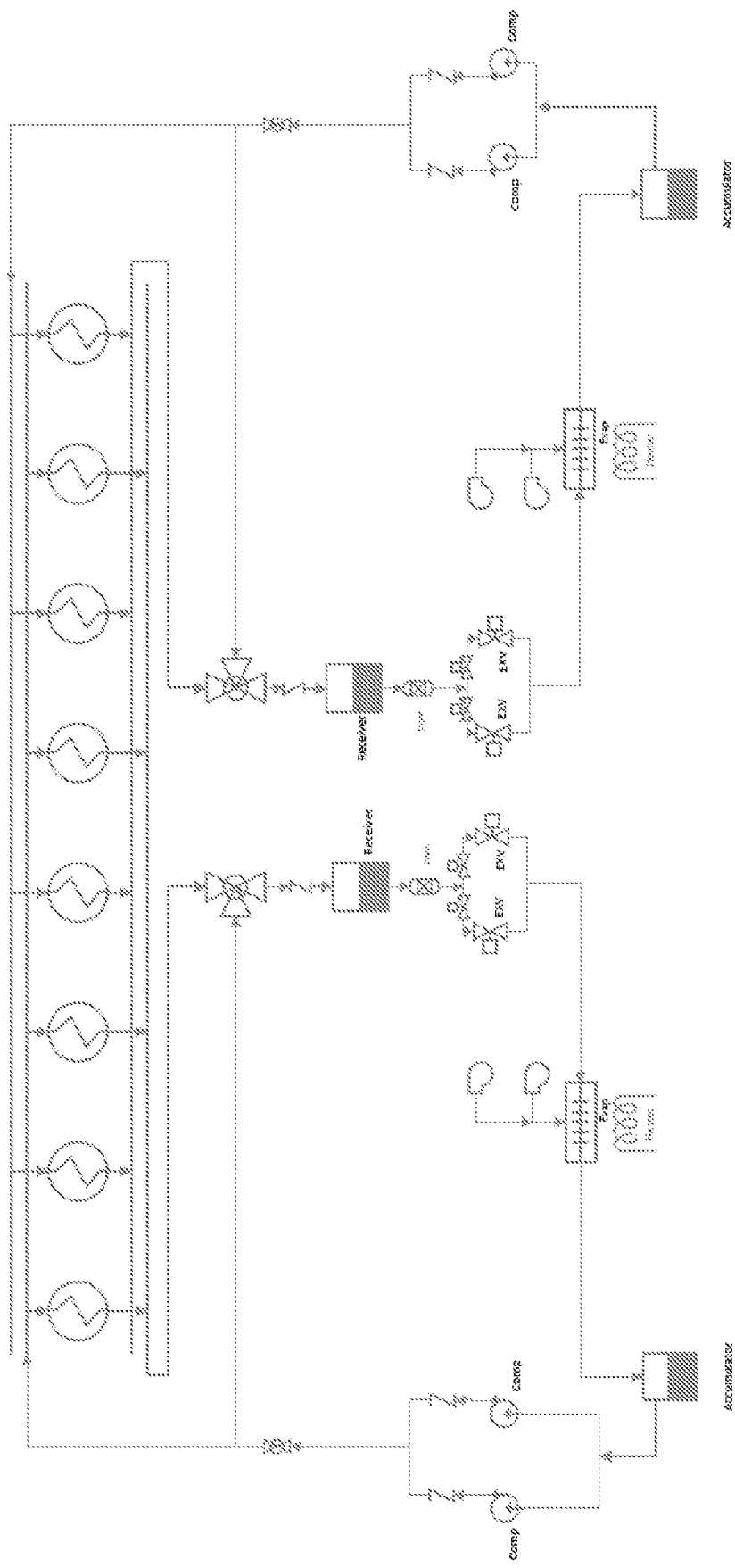
FIG. 19 is a schematic diagram of a variant of the cabin conditioning system.

As an illustrative example, incoming solar radiation through the windows around the tropopause may maintain a net heat load, which would heat the cabin without persistent cabin conditioning (in a cooling mode). In such circumstances, direct ambient air intake may be unavailable or impractical (e.g., where the pressure may be about 100 millibar or less and the oxygen concentration is very low, where the cabin is isolated from the ambient surroundings, etc.; in contrast to land-based or low Earth-atmosphere vehicles). In this circumstance, the refrigeration loop may be configured to persistently operate, relying on a LAC valve to control (reduce) pressure head (e.g., limiting refrigerant flow from the condenser and simultaneously regulating the flow of hot gas around the condenser to the receiver during low ambient conditions; examples are shown in FIG. 17 and FIG. 19). Additionally, the receiver/reservoir of the refrigeration loop can be sized to hold enough liquid refrigerant to transit through the tropopause (e.g., acting as a fluid a capacitor that is recharged later in flight with more favorable conditions), relying on the thermal mass of the receiver (and liquid refrigerant therein) to accommodate the extreme fluctuation in ambient conditions (e.g., avoid refrigerant freezing). As a first example, the receiver/reservoir can be sized to store: less than 2 kg, 2 kg, 3 kg, 5 kg, 7 kg, 10 kg, 15 kg, 20 kg, 25 kg, greater than 25 kg, any open or closed range bounded by the aforementioned values (and/or a volumetric equivalent thereof), and/or any other suitable amount of refrigerant. As a second example, the receiver/reservoir may be 'oversized' relative to the nominal refrigerant charge of the refrigerant loop (e.g., a typical receiver may be sized to house about 110% of a total refrigerant charge for a refrigeration circuit; the receiver can house: less than 150%, 200%, 220%, 250%, greater than 250%, and/or any other suitable percentage of the nominal refrigerant charge of a remainder of the refrigerant loop).

However, the refrigeration loop can be otherwise configured to operate in low ambient conditions.

The refrigerant within the refrigerant loop functions to facilitate the thermodynamic cycle (e.g., transitioning between a liquid and a superheated vapor under a compression cycle). The refrigerant can be: a hydrofluorocarbon, a chlorofluorocarbon, R-12, R-22, R-123a, R-134a, R-1233zd, R-410A, R-407C, and/or any other suitable refrigerant(s). The refrigerant within the refrigerant loop is preferably conserved/maintained during operation of the system and/or for a complete duration of a trip (e.g., to avoid changes to the refrigerant 'charge level'; without sacrificing refrigerant to the exterior environment to potentially adverse environmental effect).

The refrigerant loop can include a compressor fluidly connected between the first and second heat exchangers and configured to circulate refrigerant through the refrigerant loop (along a refrigerant flow path in a direction of flow, from the first heat exchanger acting as an evaporator to the second heat exchanger acting as a condenser) while compressing the refrigerant within superheated vapor compression phase. However, the refrigerant loop can include any other suitable compressor(s).

The refrigerant loop can include an expansion valve (e.g., such as a thermal expansion valve [TXV]) fluidly connected between the second heat exchanger and the first heat exchanger (with refrigerant flowing from the second heat exchanger to the first) which functions to reduce the pressure of the refrigerant after is passes through the condenser and before it passes through the evaporator. The expansion valve can be passive, actively controllable, and/or otherwise configured. In a first example, the expansion valve can be a thermal expansion valve (TXV). In a second example, the expansion valve can be electronically controlled (e.g., an electronic expansion valve [EEV], [EXV]) to modify a control setpoint of the refrigerant loop (e.g., a target superheat of 5 degrees Celsius; which may be modified to facilitate efficient operation in various environments/conditions). However, the refrigerant loop can include any other suitable expansion valves and/or an expansion valve can be otherwise suitably implemented.

In variants, the exterior of the expansion valve, or another cold point of the refrigeration system, can be fluidly coupled to the cabin air and/or arranged within the environment of the cabin. As an example, the expansion of refrigerant through the expansion valve may absorb thermal energy from the cabin air to cooling effect and/or may condense water vapor within the cabin air to dehumidifying effect. Alternatively, the expansion valve can be insulated, and the cold point (and corresponding dehumidification/vapor accumulation) can be downstream of the expansion valve (e.g., at the evaporator, which may be configured to collect accumulated condensate, etc.). However, the refrigeration loop can define any other suitable cold point(s) and/or dehumidification/accumulation regions within the cabin interior.

Figure 20:
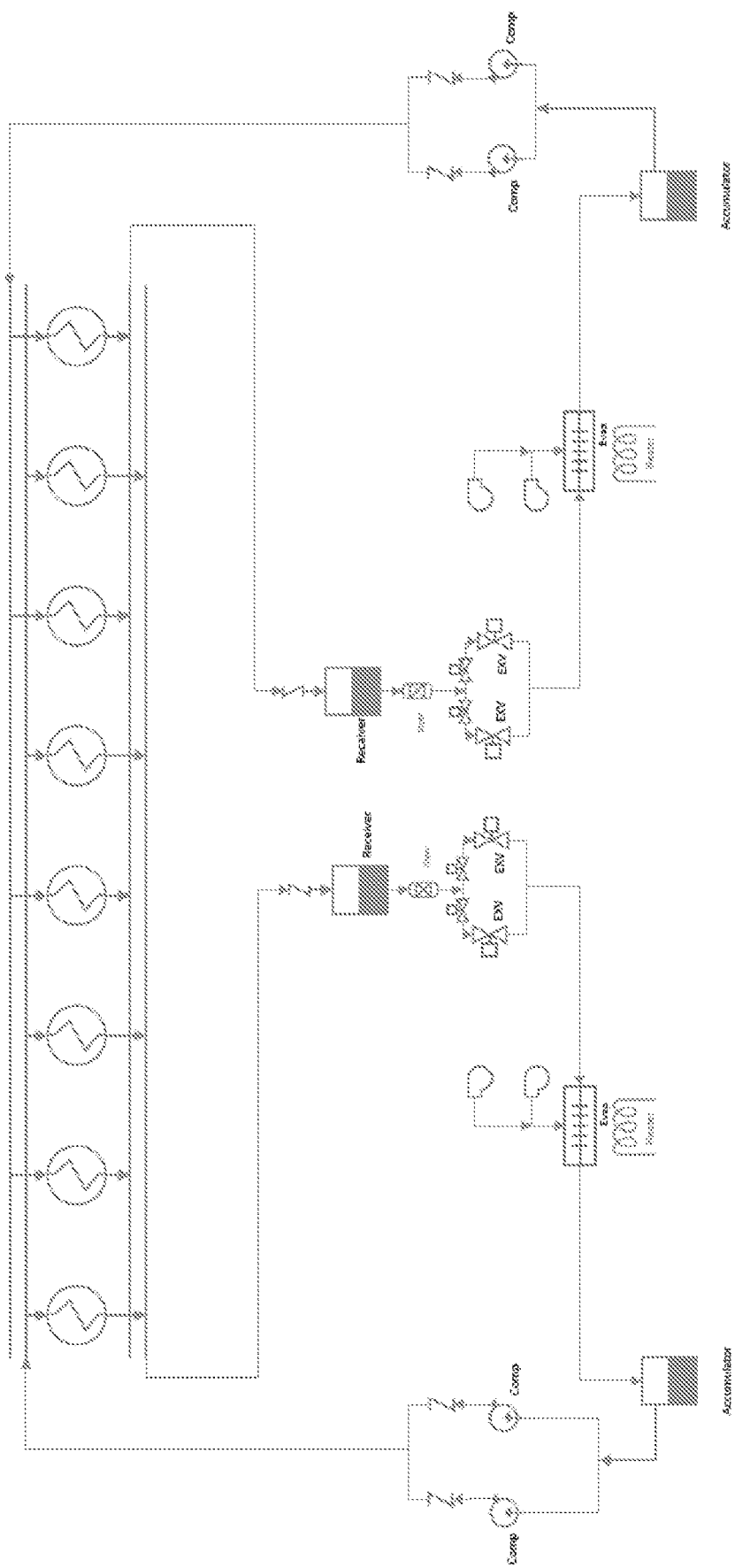
FIG. 20 is a schematic diagram of a variant of the cabin conditioning system.

The refrigerant loop is preferably redundant (e.g., examples are shown in FIGS. 17-20) and/or may incorporate one or more redundant components (e.g., in series; examples are shown in FIG. 19 and FIG. 20) and/or subloops (e.g., in parallel). For example, the system can include two refrigerant loops, each of which can include: a compressor, an expansion valve, and separate fluid routing through heat exchangers (e.g., separate channels within a unitary heat exchanger; separate heat exchangers). For example, two refrigerant loops may each be able to independently support the heat rejection and/or thermal requirements of the vehicle (e.g., configured to operate at or below 50% of capacity in a nominal dual operational case), such that the cabin environment can be maintained in the event of one (or more) component failures. However, the refrigerant loop and/or components thereof can be unitary (e.g., a unitary reservoir/volume of refrigerant may be connected to two parallel refrigeration loops/circuits, for example), and/or the refrigerant loop may incorporate any other suitable multiplicative redundancies.

In variants, operating the refrigerant loop as a heat pump can pump heat from a cabin air heat exchanger (e.g., condenser; condensing heat exchanger) to a second heat exchanger using the refrigerant. In such cases, the refrigerant loop is preferably thermally coupled to the air loop by a first heat exchanger (e.g., condenser; air-refrigerant heat exchanger or air-liquid heat exchanger) and a thermal rejection component(s) (e.g., radiative heat exchanger, permeable evaporative membrane by way of a phase change fluid loop) by a second set of heat exchangers (e.g., refrigerant-fluid heat exchanger; evaporator; radiative heat exchanger; in a cabin cooling configuration). The refrigerant loop can optionally be coupled to the cabin loop by a third heat exchanger (e.g., condenser; at superheated vapor portion of the refrigerant loop; to facilitate cabin heating and dehumidification, etc.; in parallel with the second heat exchanger with selective mode switching between the parallel loops).

Figure 3:
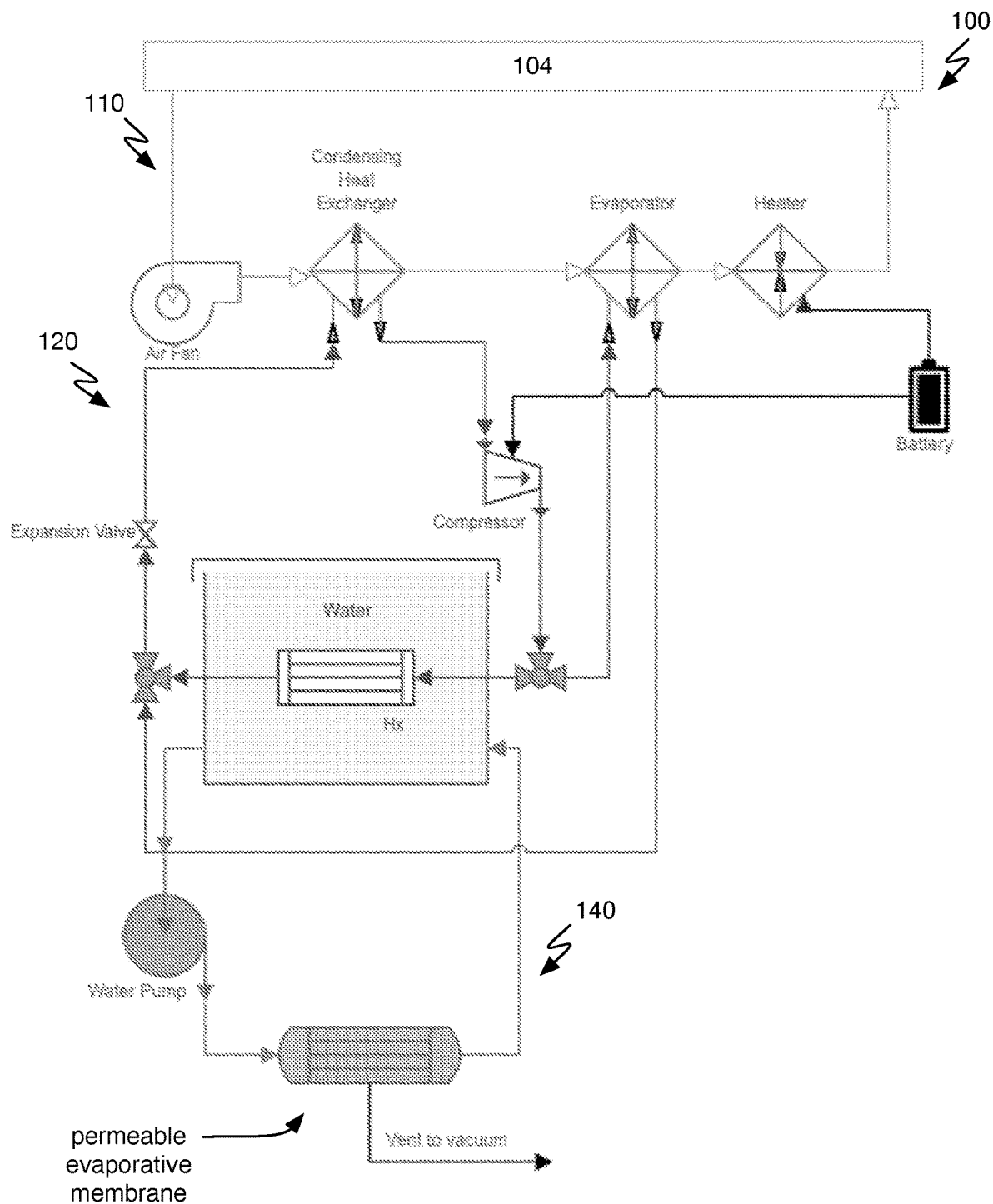
FIG. 3 is a schematic diagram of a variant of the cabin conditioning system.
Figure 4:
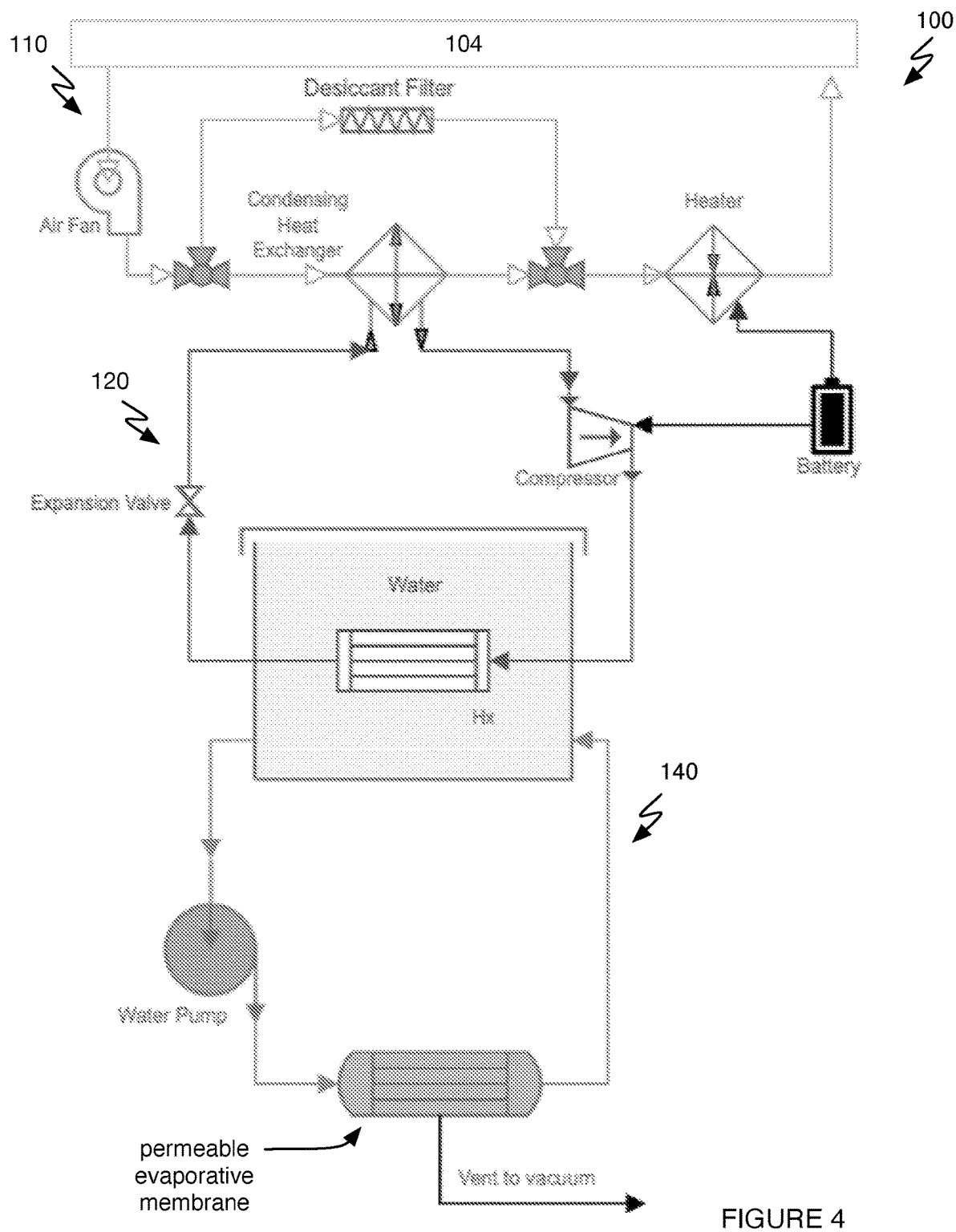
FIG. 4 is a schematic diagram of a variant of the cabin conditioning system.

In a first set of variants (e.g., an example is shown in FIG. 4; additional examples are shown in FIG. 3, FIG. 5, FIG. 6, and FIG. 9), a superheated vapor portion of the refrigerant loop can be coupled to a phase change fluid loop (e.g., water loop which is coupled to a permeable evaporative membrane) by a heat exchanger acting as a condenser. As an example, the heat exchanger can raise the temperature of the phase change fluid entering a permeable evaporative membrane to about 50-60 degrees Celsius (e.g., which can increase the rate of evaporative heat rejection through the membrane).

Figure 8:
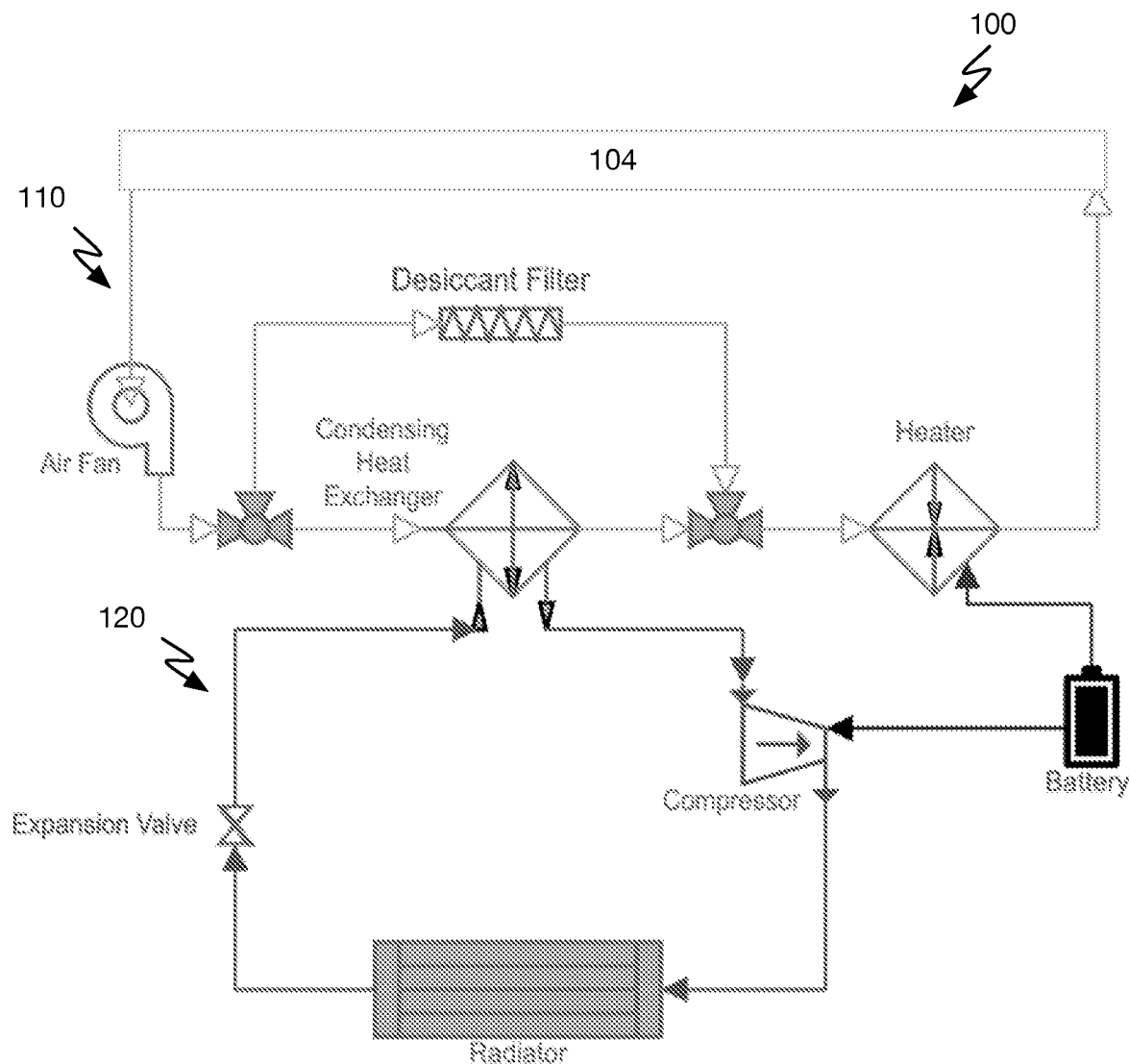
FIG. 8 is a schematic diagram of a variant of the cabin conditioning system.
Figure 9:
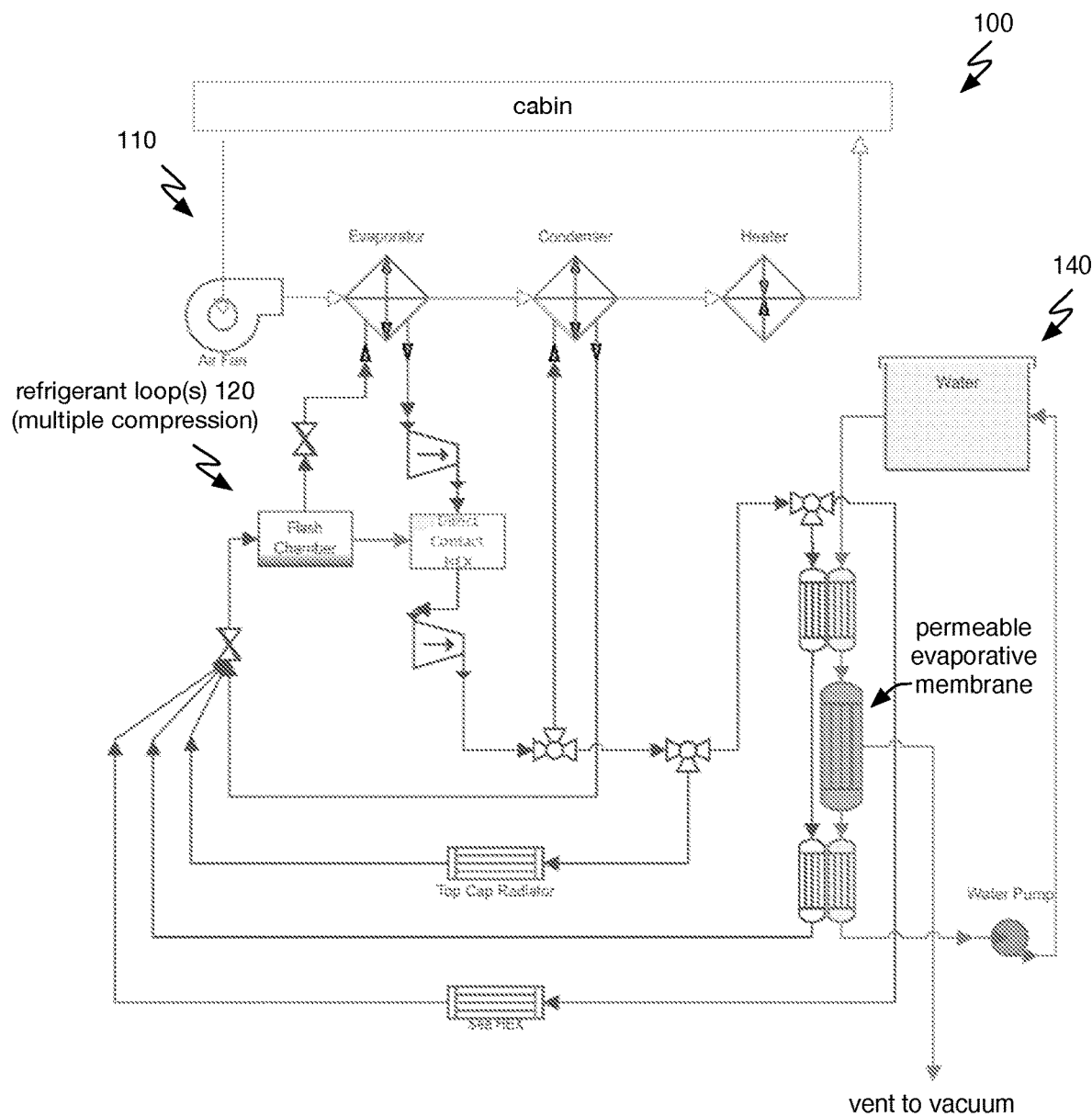
FIG. 9 is a schematic diagram of a variant of the cabin conditioning system.

In a second set of variants (e.g., an example of which is shown in FIG. 8), a superheated vapor portion of the refrigerant loop can be coupled to a (radiative) radiator (e.g., located at/above a superior surface of the capsule exterior), which acts as a condenser within the thermodynamic cycle.

In a third set of variants (e.g., an example is shown in FIG. 9), a superheated vapor portion of the refrigerant loop can be coupled to a convective heat exchanger, such as a seawater heat exchanger, automotive radiator, or other convective heat exchanger coupled to the fluid within the external environment (in low Earth atmosphere). In such variants, the convective heat exchanger (a.k.a., "Sea HEX") may be coupled to the thermal loop in parallel with a radiator and/or phase-change fluid loop and can be relied upon to supplement or replace these heat rejection mechanisms in low Earth atmosphere.

Figure 5:
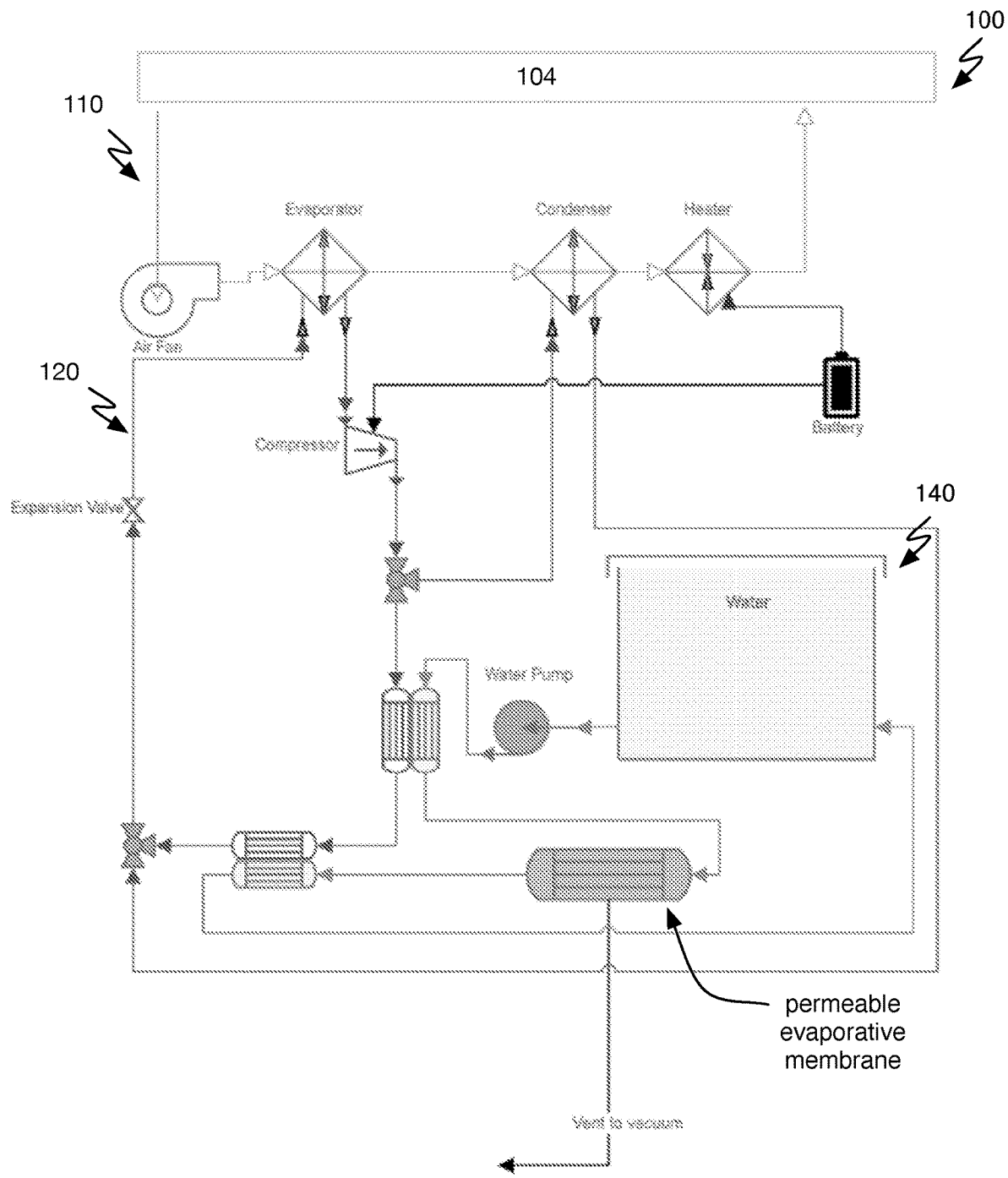
FIG. 5 is a schematic diagram of a variant of the cabin conditioning system.
Figure 6:
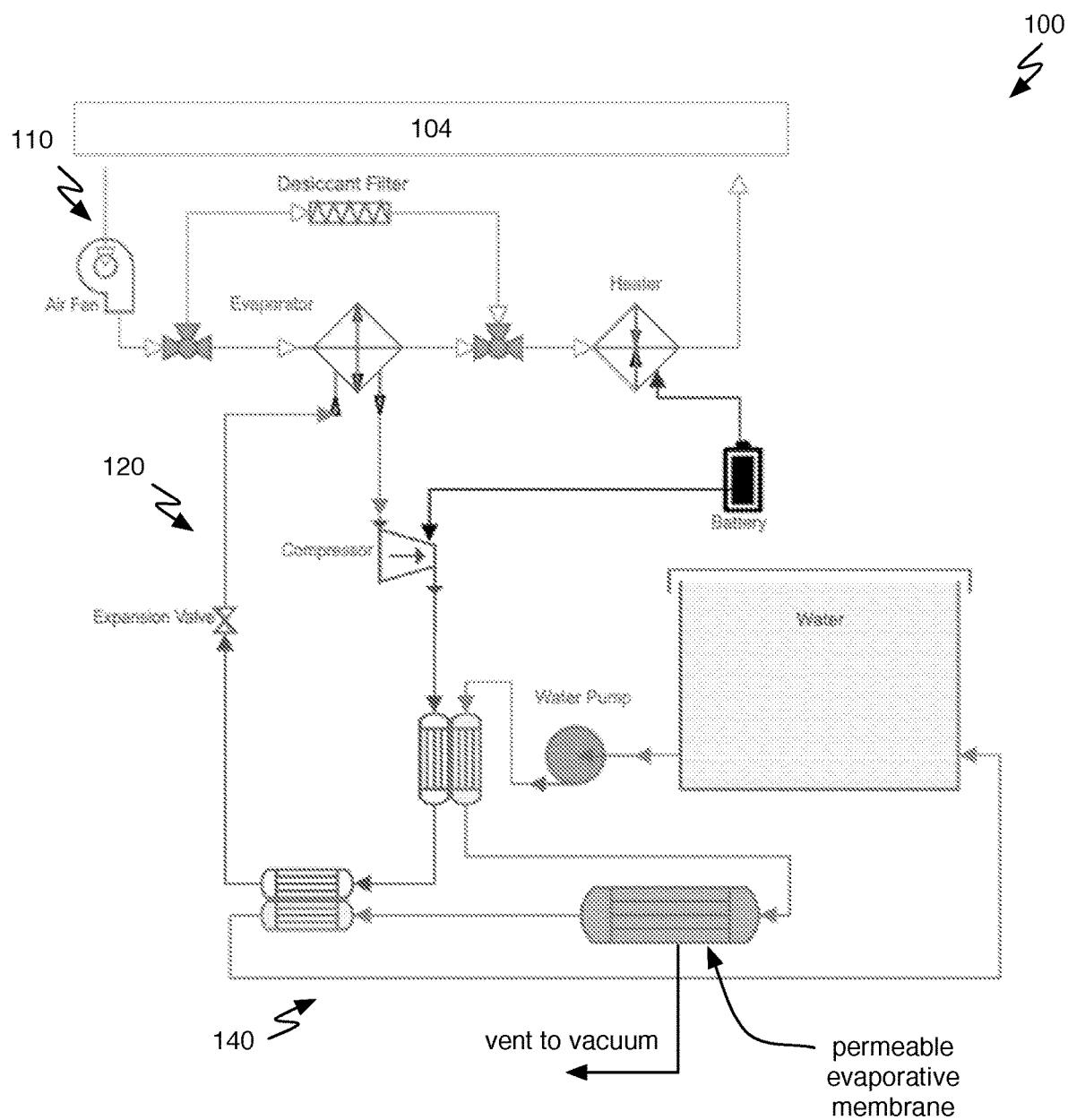
FIG. 6 is a schematic diagram of a variant of the cabin conditioning system.
Figure 7:
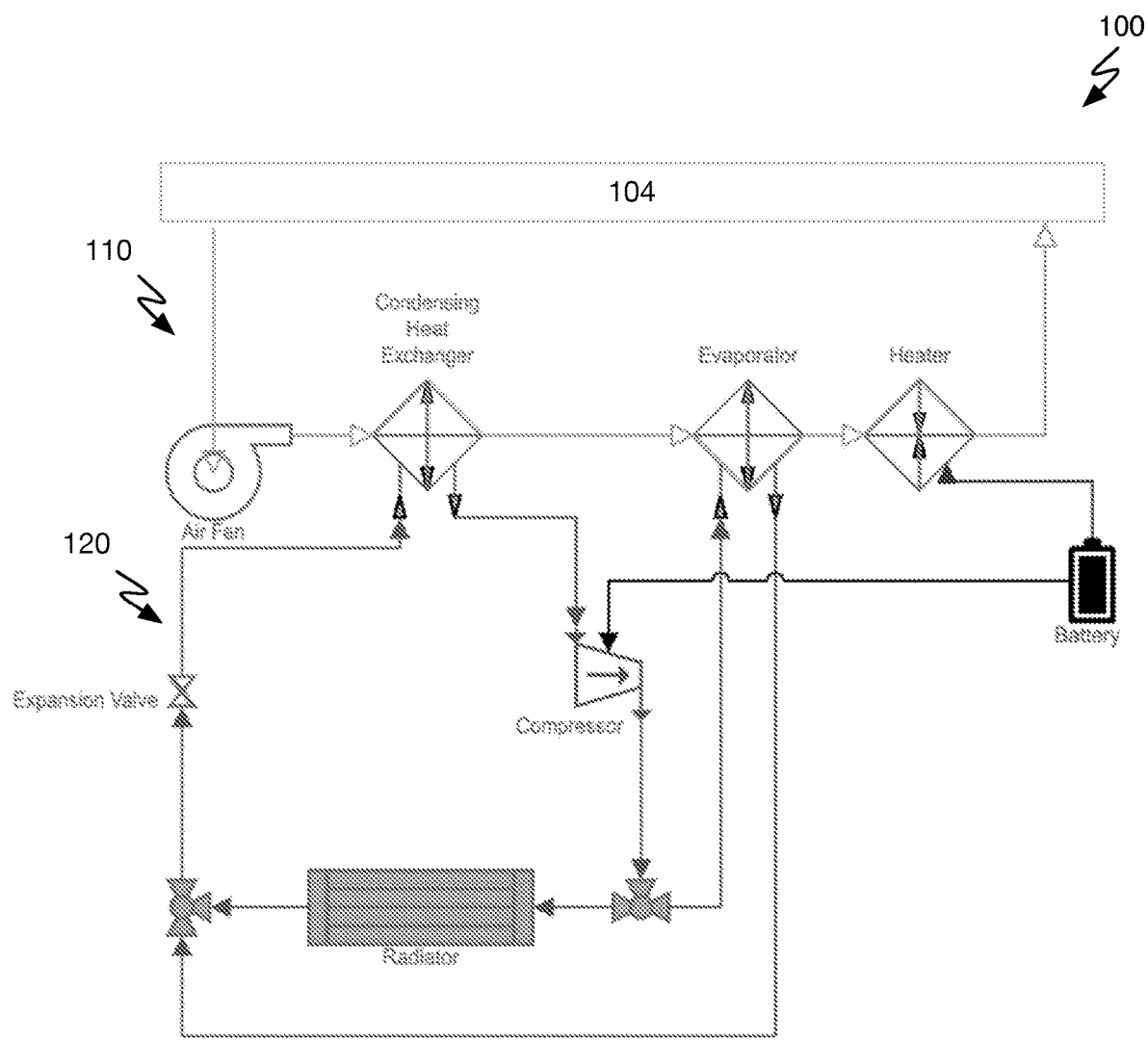
FIG. 7 is a schematic diagram of a variant of the cabin conditioning system.

In a fourth set of variants (e.g., various examples are shown in FIG. 3, FIG. 5, and FIG. 7), a superheated vapor portion of the refrigerant loop can be selectively coupled to a condenser within the cabin (e.g., in a cabin heating mode), placing the evaporator and condenser heat exchangers in opposition. In this configuration, the refrigerant loop may functionally act as a heater (e.g., since the compressor adds energy to the substantially-closed thermal system of the capsule) and/or dehumidifier (e.g., TXV can dehumidify the cabin air during operation).

In a fifth set of variants, the refrigeration loop can include any combination and/or permutation of the aforementioned loops and/or multiple instances of any elements thereof (e.g., for thermal redundancy or resilience in the variety of ambient conditions).

In variants, the refrigerant loop fluidly couples the refrigerant to a compressor, the radiator, an expansion valve, and a first heat exchanger in series.

However, the conditioning system can include any other suitable refrigerant loop(s) and/or the refrigerant loop can be otherwise suitably configured.

Figure 16:
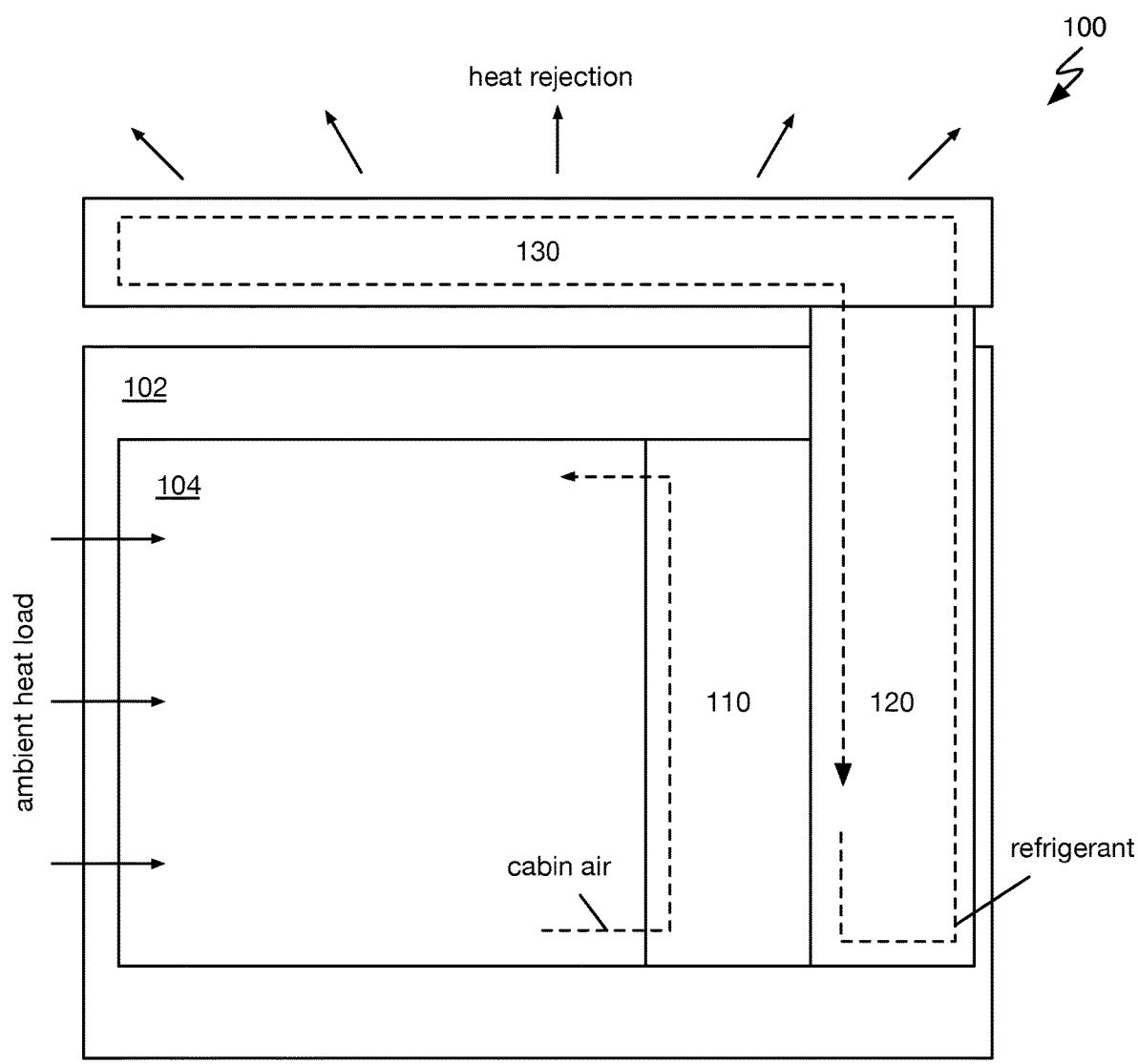
FIG. 16 is a schematic representation of a variant of the cabin conditioning system.

The set of heat rejection components functions to reject heat to the vehicle surroundings (e.g., an example is shown in FIG. 16). Heat rejection components preferably include a (radiative) radiator and/or a permeative evaporative membrane, but can optionally include a convective heat exchanger (e.g., Sea HEX), and/or any other suitable components. Heat rejection components are preferably arranged at an exterior of the capsule and/or may be thermally insulated from the capsule (e.g., substantially thermally isolated, such as at float altitudes of about look feet, when submerged in seawater, etc.).

In an example the set of heat rejection components can include a radiator mounted to the pressure vessel capsule, arranged outside the cabin interior and offset from the superior surface.

3.1 Radiator Variants

In a first set of variants, the set of heat rejection components can include a (radiative) radiator mounted to the top of the vehicle capsule (e.g., a top-cap radiator arrangement) which is oriented towards deep space and/or arranged beneath a balloon (such as a hydrogen-filled or helium-filled balloon; balloon containing a lighter-than-air fluid). In such variants, the heat rejection may be a function of the exposed surface area and/or radiative properties of the radiator. For instance, the radiator can cover a majority of the superior surfaces of the vehicle (e.g., greater than 50%, 75% 80%, 85%, 90%, 95%, 100%, any open or closed range bounded by the aforementioned values, and/or any other suitable area fraction of the superior surfaces; examples of superior surfaces are shown in FIG. 2). Additionally, the radiator is preferably offset from the surface(s) of the vehicle (e.g., by empty space or an exterior air-gap, in the case of low-Earth atmospheres, eliminating direct conduction between the vehicle body and the radiator, which may reduce the net thermal rejection of the system), but can alternatively be insulated from the vehicle exterior and/or vehicle body, or can be otherwise suitably mounted and arranged.

The vehicle exterior and/or radiator (e.g., a superior surface of the radiator) may additionally be colored and/or coated with a high emissivity material (e.g., white paint, etc.; emissivity coefficient of 0.5, 0.65, 0.75, 0.9, 0.95, 0.97, 0.98, 0.99, greater than 0.99, any range bounded by the aforementioned values, etc.) to reduce the absorbed thermal radiation from the environment (e.g., background solar absorption, maximize emitted radiation and/or reradiation, etc.), but can alternatively be uncoated and/or otherwise implemented. In one example, the radiator is substantially thermally isolated from the superior surface (e.g., separated by an exterior void such or exterior air-gap) and can include a coating at a superior surface of the radiator with an emissivity coefficient which is greater than 0.65. Additionally, the radiator can include a low emissivity on an inferior surface (e.g., proximal to the vehicle exterior and/or on a side facing the vehicle exterior; lower emissivity than the high emissivity coating; with an emissivity which is less than 0.1, 0.1, 0.2, 0.3, 0.4, 0.5, greater than 0.5, any open or closed range bounded by the aforementioned values, etc.), which may reduce re-radiation from the radiator to the vehicle capsule. As an example, a superior surface/coating of the radiator can have higher emissivity than an inferior surface/coating of the radiator. However, the radiator and/or vehicle capsule can include any suitable exterior coatings or material(s).

In some variants of the first set, it may be advantageous for stability, packaging, and structural reliability to arrange refrigerant loop components (e.g., compressor), air loop components (e.g., fans, air manifold, ducting, etc.) and/or heavy components of the system (e.g., batteries, compressor, etc.) beneath the floor of the cabin (e.g., such as below the cabin windows in FIG. 2; beneath passenger seats, an example of which is shown in FIG. 10; etc.). As an example, a cabin heat exchanger and a compressor can be arranged between the passenger seat(s) and a nadir end of the capsule relative to the primary axis. As a second example, a battery pack mounted to the pressure vessel capsule between the passenger seat and the nadir end relative to the primary axis (e.g., the battery pack electrically coupled to a compressor of the refrigerant loop and a fan of the cabin air loop). In such circumstances, superheated refrigerant may be routed from the compressor up the sides/walls of the vehicle to the radiator at the superior vehicle exterior of the vehicle. As an example, the superheated refrigerant is preferably routed through channels/plenum within the walls of the cabin (e.g., between windows; via HVAC routing, refrigerant lines, etc.; an example is shown in FIG. 14) and heavily insulated (e.g., to avoid heat loss from re-entering the cabin environment). However, the refrigerant loop (and/or components thereof) can alternatively be arranged entirely above the top of the windows, within a roof or top section of the vehicle, and/or can be otherwise arranged within the vehicle.

Figure 13:
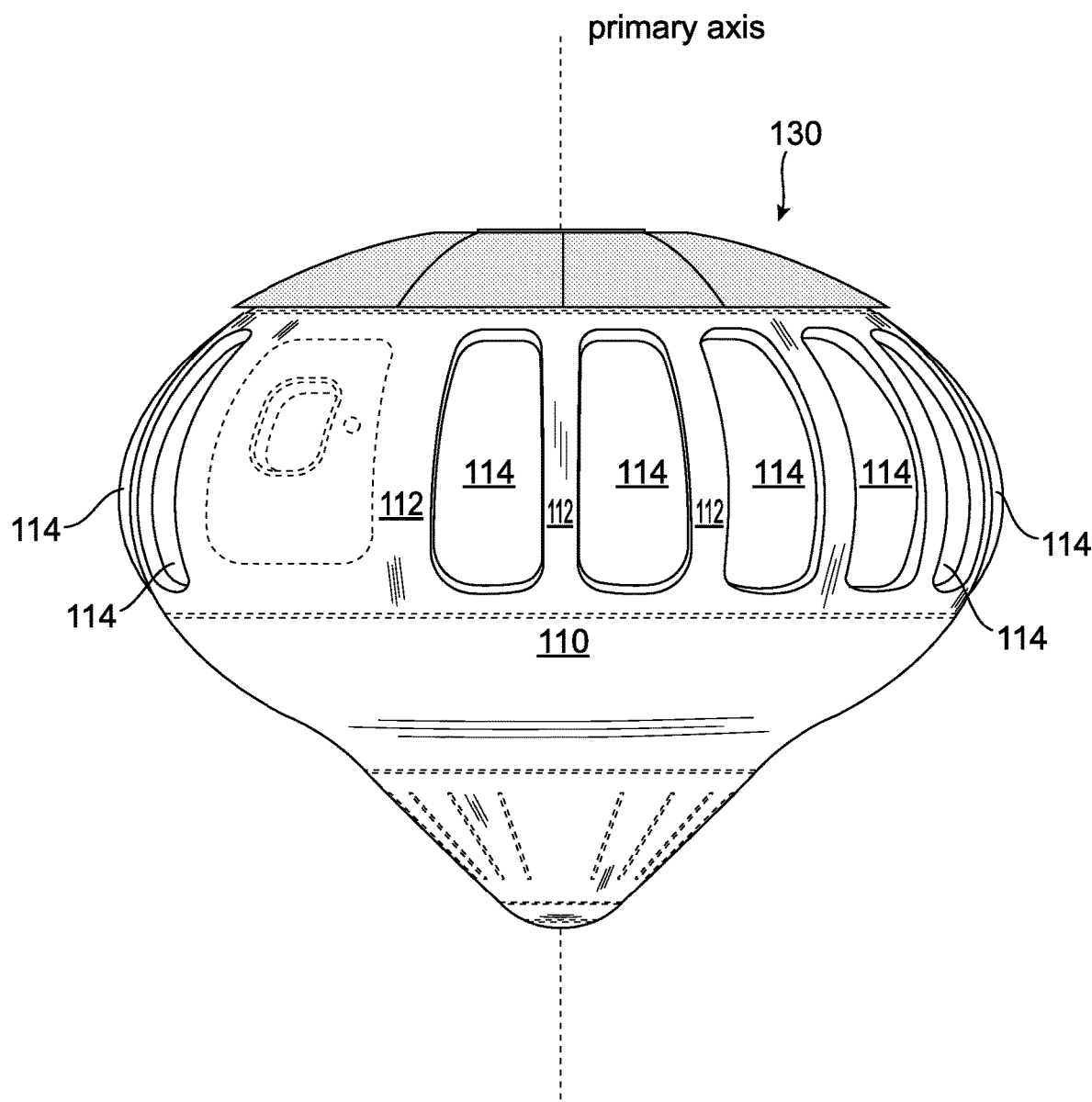
FIG. 13 is a side view of an example arrangement of a radiator in a variant of the cabin conditioning system.

As an example, the radiator can have an exterior surface area and/or vertically projected area of at least a 10 square meters (e.g., 18-19 square meters) covering/capping an annular shaped superior surface of the vehicle (e.g., examples are shown in FIG. 12, FIG. 13, and FIG. 14). The superheated refrigerant can be circulated through a plurality of interior channels of the radiator (e.g., in any combination of series and/or parallel; aluminum tubes, copper tubes, high conductivity material channels, etc.) and/or can otherwise transfer thermal energy to the radiator (to be rejected via radiative heat transfer).

The radiator can be of unitary construction or may be an assembly of multiple components (e.g., panel construction, which may facilitate fabrication, assembly, and integration with a large pressure vessel capsule). In variants, the radiator can be formed with multiple petallike panels ('petals'), such as petals radially encircling a central axis of the vehicle (e.g., fanning radially outwards; similar to the petals of a flower; examples are shown in FIG. 12 and FIG. 13; etc.). For instance, the radiator can include a set of petal elements radially encircling a central axis of the pressure vessel, each petal constructed from an array of (die) extruded elements. As an example, the radiator can include a plurality (e.g., 2, 3, 4, 6, 8, 12, any open or closed range bounded by one or more of the aforementioned values, etc.) of petals, each including a plurality (e.g., 4, 8, 12, 15, 18, 19, 20, 21, 24, 32, any open or closed range bounded by one or more of the aforementioned values, etc.) of extruded elements arranged meridionally atop the vessel. As an example, the petals can be offset from the top of the pressure vessel capsule by a set of stubs or standoffs, or may be otherwise mounted to the pressure vessel capsule. The joints of the radiator petals may be welded (e.g., TIG welded), soldered, inductively welded, bonded, and/or otherwise integrated into a single assembly. The radiator is preferably constructed with aluminum but can additionally include copper, brass, steel (e.g., stainless) elements, and/or may include any other suitable materials.

Figure 11:
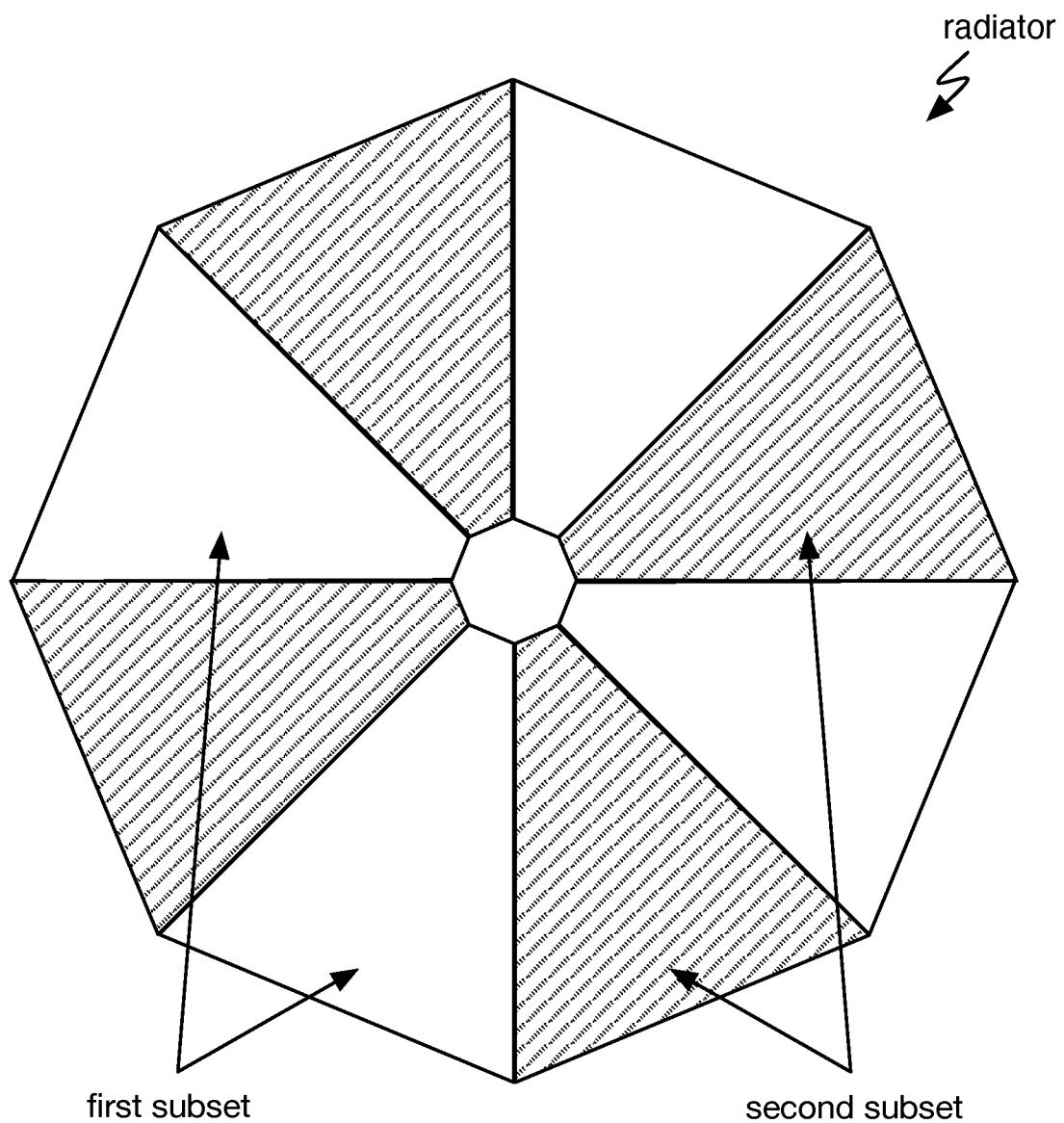
FIG. 11 is a diagrammatic example of a radiator in one or more variants of the cabin conditioning system.

In variants which include a plurality of redundant/parallel refrigerant loops, the subsets of the petals may be connected to the refrigerant loops/circuits in parallel, which may mitigate or eliminate propagation of failures through various components of the system. As an example, the system can include a first refrigerant loop fluidly coupled to fluid channels within a first subset of the plurality of petals and a second refrigerant loop, fluidly isolated from the first refrigerant loop, which is fluidly coupled to fluid channels within a second subset of the plurality of petals, wherein the first and second subsets are disjoint. Additionally, the first and/or second subsets of petals can be arranged in a non-contiguous arrangement (e.g., wherein some or all petals of the first subset are not contiguous and/or some or all petals of the second subset are not contiguous), such as an alternating pattern about the central axis (e.g., an example is shown in FIG. 11); in some examples, this may beneficially distribute off-axis solar radiation more uniformly between the first and second subsets of panels. For example, for large zenith angles of the sun (e.g., 30 degrees, etc.), the petals proximal to the sun may be relatively less effective at radiative heat rejection compared to the distal petals (e.g., which may not receive significant solar radiation and/or which may be oriented towards deep space). Accordingly, subsets (e.g., redundant subsets) of petals arranged in an alternating pattern (and/or any other suitable non-contiguous arrangement) may substantially balance or even-out the heat rejection capabilities of parallel/redundant refrigerant loops connected to the respective subsets (e.g., increasing the maximum heat rejection of each individual refrigeration loops for the worst-case, off-axis solar load scenario). For example, if solar radiation is received primarily along a first side of the radiator, an alternating or otherwise non-contiguous distribution of petals between the different subsets can ensure that the excess solar radiation is distributed (e.g., distributed substantially evenly) between the different subsets of petals; in contrast, for a system with contiguous subsets of petals, all or substantially all of the excess solar radiation could, in some circumstances, be incident on petals of a single such subset. However, working fluid (e.g., refrigerant within refrigerant loops) may be otherwise suitably routed through the radiator and/or the radiator may be otherwise suitably constructed/integrated.

In variants, individual petals (or groups thereof) can be selectively coupled/decoupled to the refrigerant loop via an electronic valve(s) (e.g., such as a solenoid valve), which may allow faulty or underperforming petals to be selectively isolated/decoupled from a remainder of the refrigerant loop (e.g., which may avoid propagation of faults to other portions of the thermal circuit; which may isolate leaks/failures to a single petal or group of petals, without impact to a remainder of the refrigerant loop). Alternatively, petals can be collectively coupled/grouped and/or can be otherwise integrated with the system.

However, the set of heat rejection components can include any other suitable (radiative) radiator. Alternatively, the set of heat rejection components may not utilize a radiator in one or more variants or configurations of the system.

3.2 Permeable Evaporative Membrane Variants

In a second set of variants, the set of heat rejection components can include a permeable evaporative membrane, which functions to reject heat by the phase change of liquid water to water vapor (through the permeable evaporative membrane into the exterior environment). In such variants, the refrigerant loop can pump heat from the cabin air loop to a phase change-fluid loop, which circulates heated fluid (e.g., water) through channels of the permeable evaporative membrane, through which an evaporated portion of the phase-change fluid (in vapor form) is vented into the exterior environment (e.g., a vacuum).

In variants, the permeable evaporative membrane can optionally be used with a sweep gas and/or a sweep gas mechanism, which functions to forcibly eject or 'sweep' vapor-phase (phase-change) fluid away from the permeable evaporative membrane. Utilizing a sweep-gas may avoid vapor accumulation and rapidly freezing in low ambient temperatures (e.g., where cooling is still required as a result of the thermal load; such as between 20k-60k feet), which might otherwise impede the functionality of the permeable evaporative membrane (e.g., at lower atmospheres), such as by blocking venting to vacuum and reducing the rate of heat rejection. As an example, the sweep gas may be a sacrificial gas (e.g., air, etc.), which is stored in a compressed form onboard the vehicle (e.g., prior to launch, while the vehicle is within a low-Earth atmosphere, etc.). As a second example, the sweep gas can be exterior air which is circulated across the permeable evaporative membrane (e.g., within an outer casing, across the vapor permeable surfaces, etc.) from the vehicle surroundings using a fan (e.g., blower fan) or air compressor. However, the permeable evaporative membrane can alternatively be used without a sweep gas, and/or can be otherwise deployed.

The permeable evaporative membrane can be integrated into the vehicle frame and/or vehicle structure, can be modularized in the form of a set of cartridges (e.g., mounted in parallel), and/or can be otherwise suitably implemented. As an example, the permeable evaporative membrane can include a plurality (e.g., 100-200) parallel tubes or fluid channels formed by the membrane. The interior of the parallel tubes can house and/or contain a phase change fluid (e.g., working fluid of a phase-change loop) within a fluidic interior, the exterior venting to the vehicle exterior/vacuum. The tubes/channels can be housed and/or encased within a shell (e.g., in a modular cartridge), integrated into the vehicle body, and/or can be otherwise implemented.

The permeable evaporative membrane is preferably arranged above the windows and/or above a waterline of the vessel (e.g., in a sea-faring configuration), which can allow vacuum venting to air (rather than venting to seawater) while the vehicle is afloat. However, the permeable evaporative membrane can alternatively be below the floor of the vehicle and/or beneath passenger seats, and/or can be otherwise suitably arranged on the vehicle.

In variants utilizing a permeable evaporative membrane, the system preferably includes an optional phase-change fluid loop which thermally couples the permeable evaporative membrane to the refrigerant loop (e.g., at a heat exchanger acting as a condenser; at a superheated vapor portion of the refrigerant loop). This configuration may increase the temperature of the phase-change fluid entering the permeable evaporative membrane to improve the heat-rejection performance, as evaporation is driven by a difference in water vapor partial pressure across the permeable evaporative membrane (e.g., thus, increasing the water temperature increases the partial pressure and the resulting heat-rejection performance). The phase-change fluid loop can include: a working fluid, a pump, and a fluid reservoir. The pump circulates the phase change fluid through a heat exchanger(s) coupling the phase change fluid loop to the refrigerant loop and through the permeable evaporative membrane (e.g., interior channels, cartridge, etc.). The working fluid (a.k.a., 'phase change fluid') within the phase change fluid loop is preferably water (e.g., pure water, distilled water, RO water, milli-Q water, tap water, filtered/desalinated seawater, etc.), but can alternatively be a water-glycol mixture (e.g., 80/20, 70/30, 50/50, etc.), and/or any other suitable phase change fluid or fluid mixture. In variants, the working fluid within the phase-change fluid loop (e.g., water) can be a sacrificial fluid in that it is not conserved in the heat rejection process (e.g., the net volume decreases during a vehicle trip and/or as a function of rejected heat) and/or is periodically replenished or refilled (e.g., between vehicle trips, on the ground, using condensed water vapor dehumidified from the cabin air, etc.). In such variants, the phase change fluid loop preferably includes a fluid reservoir or tank (e.g., water tank) of sufficient volume to sustain continued permeable evaporative membrane heat rejection throughout a trip. As an example, the phase-change fluid loop can include a reservoir housing a phase change fluid mass of: less than 5 kg, 5 kg, 10 kg, 25 kg, 50 kg, 65 kg, 75 kg, greater than 75 kg, any range bounded by the aforementioned values, and/or any other suitable phase change fluid mass. However, the phase-change fluid loop can include any other suitable reservoir or can be otherwise implemented.

The phase-change working fluid (e.g., water in liquid phase) entering the permeable evaporative membrane is preferably 50-60° C., at an inlet, and can be cooled to 0-10° C. through the interior of the evaporative membrane (e.g., outlet temperature of ° C.). In variants, heat can be pumped into the phase-change fluid loop at one or more condensers of the refrigerant loop (e.g., counterflow heat exchanger, parallel flow heat exchanger, etc.). In some variants, the liquid-phase working fluid can be reheated via a second (condenser) heat exchanger of the refrigerant loop after being circulated through the permeable evaporative membrane (e.g., to maintain an elevated temperature of the fluid within the phase-change fluid loop and/or reservoir, to improve the performance of the refrigerant loop heat pump; an example is shown in FIG. 5). However, the phase-change working fluid can otherwise receive thermal energy from the refrigerant loop (e.g., which transfers thermal energy from the cabin air loop into the phase-change fluid loop).

However, the phase-change fluid loop and/or permeable evaporative membrane can be otherwise suitably implemented.

3.3 Sea Heat Exchanger Variants

Figure 15:
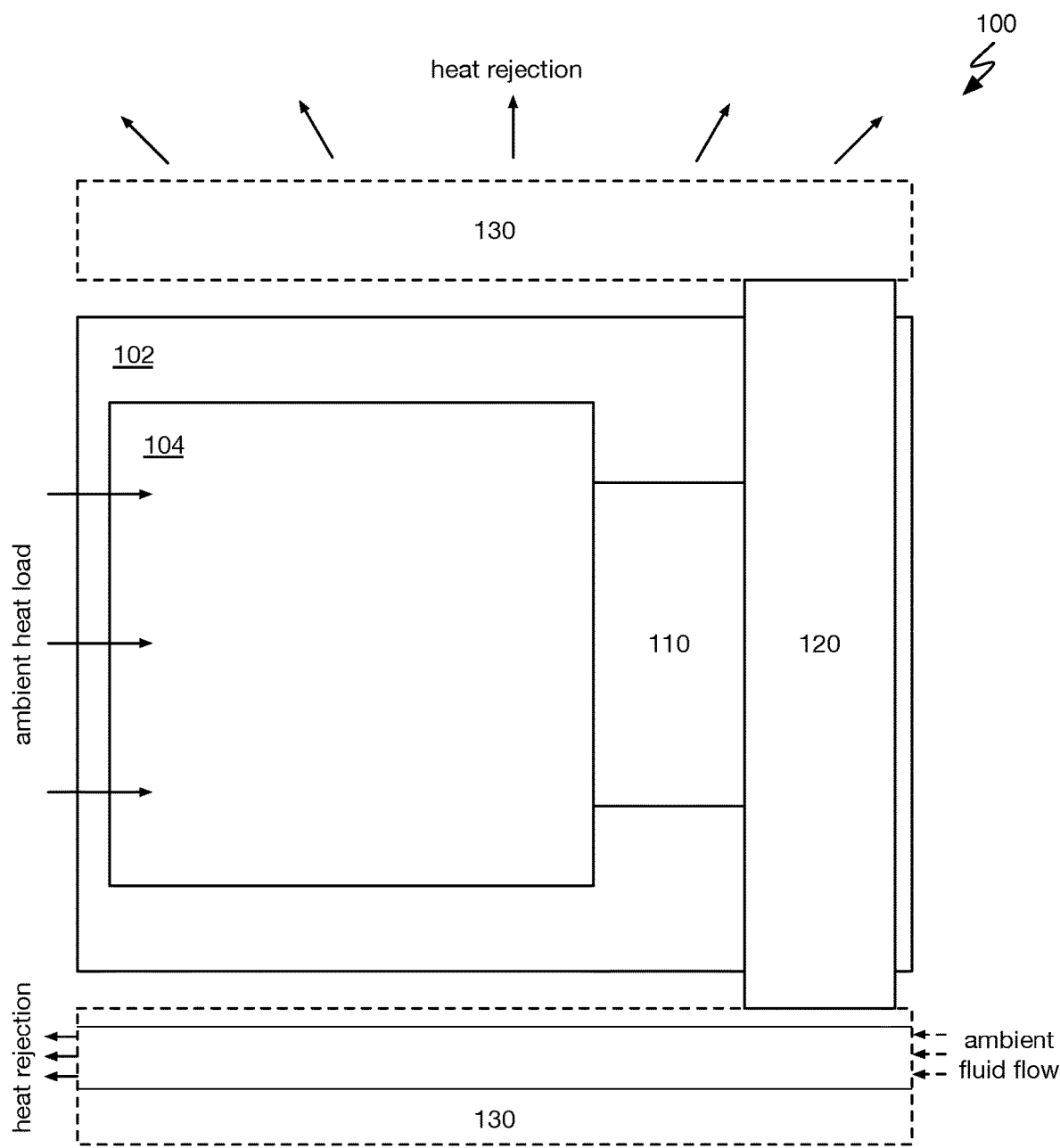
FIG. 15 is a schematic representation of a variant of the cabin conditioning system.

In variants, the set of heat rejection components can optionally include a sea heat exchanger which functions to reject heat by convection within low Earth atmospheres (e.g., at sea level, when the vehicle is afloat, etc.; an example is shown in FIG. 15). For example, the sea heat exchanger can be an automotive radiator, seawater heat exchanger, and/or other suitable heat exchanger. The sea heat exchanger is preferably selectively utilized in low-Earth atmospheres and can be connected in series and/or parallel with other heat exchanger components (or heat exchangers/fluid loops connected thereto; examples are shown in FIG. 14 and FIG. 15). The sea heat exchanger can optionally be coupled to an external fan (e.g., ducted, shrouded, unshrouded, etc.) or propeller, which may facilitate forced convection of an external fluid (e.g., of air and/or seawater) through the sea heat exchanger.

However, the system can include any other suitable sea heat exchange and/or may otherwise exclude a sea heat exchanger. Additionally or alternatively, a sea heat exchanger can be selectively decoupled from the refrigerant loop(s) in one or more modes of operation.

However, the cabin conditioning system can include or be used with any other suitable heat rejection components.

3.4 Energy Source

The cabin conditioning system can optionally include or be used with an energy source which functions to supply energy to power-consuming components of the cabin conditioning system (e.g., fans, pumps, refrigerant compressors, resistive heaters, solenoid valves, etc.). The energy source is preferably housed within the pressure vessel capsule and is independent of a vehicle propulsion system for the aerial vehicle (e.g., substantially decoupled from vehicle propulsion mechanisms; substantially independent from the potential energy of a lift gas within the balloon of a balloon vehicle, etc.). For instance, the energy source may be dedicated to cabin conditioning and/or thermal management. However, the energy source can additionally or alternatively facilitate control of vehicle propulsion (e.g., directing the use of a propulsive energy source, such as an expanding gas, jet fuel, etc.; without serving as the primary energy source) and/or may otherwise be directly or indirectly used for vehicle propulsion/control. The energy source is preferably a battery (e.g., such as a lithium-ion battery, such as LFP or NMC, etc.), but can additionally or alternatively include a generator, vehicle alternator, and/or any other suitable power source. In a specific example, the power source can be a battery sized based on the thermal requirements of the cabin conditioning system (e.g., about 5 kW of heat rejection at steady state) and/or size of the cabin windows (e.g., window area in excess of 10 square meters, window area between 10% and 20% of a total capsule surface area, etc.). Accordingly, depending on the maximum duration of a vehicle trip (e.g., 6 hours, 10 hours, etc.), the resulting battery mass associated with the thermal requirements of the cabin conditioning system can be: less than 100 kg, 100 kg, 200 kg, 300 kg, 400 kg, 500 kg, 600 kg, 1000 kg, greater than 1000 kg, any open or closed range bounded by the aforementioned values, and/or any other suitable mass. However, the cabin conditioning system can include any other suitable energy source(s).

However, the system can include any other suitable components.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A vehicle system comprising:
   a pressure vessel capsule comprising:
   a superior surface at a first end;
   a structural frame comprising a set of support members extending between the first end and a second end, wherein each support member of the set comprises a composite plenum; and
   a set of windows attached to the structural frame, each window extending between a respective pair of adjacent support members of the set, wherein the set of windows and the structural frame cooperatively define a cabin interior which is configured to be fluidly isolated from an exterior environment;
   a set of mounts at the superior surface of the pressure vessel configured to tether a lighter-than-air balloon to the pressure vessel capsule;
   a radiator mounted to the pressure vessel capsule, arranged outside the cabin interior and offset from the superior surface;
   a first heat exchanger mounted within the pressure vessel capsule;
   a cabin air loop, comprising:
   a cabin air manifold fluidly coupled to the first heat exchanger, the cabin air manifold comprising each of the composite plenums; and
   a fan configured to circulate the cabin air through the cabin air manifold; and
   a refrigerant loop comprising a refrigerant, the refrigerant loop configured to thermally couple the first heat exchanger and the radiator.

2. The vehicle system of claim 1, wherein, in a heat rejection mode, the refrigerant loop is configured to transfer heat from the first heat exchanger to the radiator via a refrigeration cycle, with the radiator at a higher temperature than a cabin air temperature.

3. The vehicle system of claim 1, wherein the radiator is configured to condense superheated refrigerant within the refrigerant loop.

4. The vehicle system of claim 1, wherein the set of windows defines an exterior window area of greater than 10 square meters, wherein the radiator covers a majority of a surface area of the superior surface.

5. The vehicle system of claim 1, further comprising a passenger seat arranged within the cabin interior of the pressure vessel capsule and structurally supported by the second end.

6. The vehicle system of claim 5, wherein the vehicle system defines a primary axis between the first end and the second end, wherein the refrigerant loop comprises a compressor, wherein the first heat exchanger and the compressor are arranged between the passenger seat and the second end relative to the primary axis.

7. The vehicle system of claim 6, further comprising a battery pack mounted to the pressure vessel capsule between the passenger seat and the second end relative to the primary axis, the battery pack electrically coupled to the compressor and the fan.

8. The vehicle system of claim 1, wherein the refrigerant loop comprises a low ambient control valve.

9. The vehicle system of claim 1, wherein the vehicle system comprises a stratospheric balloon vessel configured to float within the stratosphere.

10. The vehicle system of claim 1, wherein the radiator comprises a plurality of petals radially encircling a central axis, wherein the refrigerant loop is fluidly coupled to fluid channels within a first subset of the plurality of petals, wherein the vehicle system further comprises a second refrigerant loop, fluidly isolated from the refrigerant loop, which is fluidly coupled to fluid channels within a second subset of the plurality of petals, wherein the first and second subsets are disjoint.

11. The vehicle system of claim 10, wherein the first and second subsets of petals are arranged in an alternating pattern about the central axis.

12. A system for environmental conditioning of a pressurized cabin interior of a vehicle system, comprising:
  a pressure vessel capsule defining the cabin interior and housing cabin air within the cabin interior;
  a first heat exchanger mounted within the pressure vessel capsule;
  a cabin air loop, comprising:
    a cabin air manifold fluidly coupled to the first heat exchanger; and
    a fan configured to circulate the cabin air through the cabin air manifold;
  a radiator mounted to an exterior surface of the pressure vessel capsule and comprising a plurality of petals radially encircling a central axis; and
  a first refrigerant loop comprising a refrigerant, the first refrigerant loop configured to thermally couple the first heat exchanger and the radiator, wherein the first refrigerant loop is fluidly coupled to fluid channels within a first subset of the plurality of petals; and
  a second refrigerant loop, fluidly isolated from the first refrigerant loop, which is fluidly coupled to fluid channels within a second subset of the plurality of petals, wherein the first and second subsets are disjoint.

13. The system of claim 12, wherein the radiator comprises a high emissivity coating, wherein the radiator is substantially thermally isolated from the exterior surface.

14. The system of claim 12, wherein the first refrigerant loop fluidly couples the refrigerant to a compressor, the radiator, an expansion valve, and the first heat exchanger in series.

15. The system of claim 14, wherein the first refrigerant loop is configured to pump heat from the first heat exchanger to the radiator, with the radiator at a higher temperature than a cabin air temperature.

16. The system of claim 14, further comprising an energy source housed within the pressure vessel capsule, the energy source configured to power the fan and the compressor, wherein the energy source is independent of a vehicle propulsion system for the aerial vehicle.

17. The system of claim 16, wherein an energy capacity of the energy source is configured to operate the compressor and the fan for a duration of a vehicle trip, the vehicle trip spanning at least 6 hours and an altitude range of at least 80,000 feet.

18. The system of claim 12, wherein the first refrigerant loop comprises a low ambient control valve.

19. The system of claim 12, wherein the pressure vessel capsule is configured to maintain pressurization within the cabin interior while fluidly isolating the cabin interior from the surrounding environment.

20. The system of claim 12, wherein the radiator is configured to condense superheated refrigerant within the first refrigerant loop.

21. The system of claim 12, further comprising a second heat exchanger within the pressure vessel capsule, wherein, in a first mode, the first refrigerant loop is configured to operate as a heat pump between the first heat exchanger and the second heat exchangers.

22. The system of claim 21, further comprising an electric heater, fluidly coupled to the cabin air manifold.

23. The system of claim 12, wherein the first refrigerant loop comprises an expansion valve, wherein the cabin air circulated through the cabin air loop is at least partially dehumidified, within the cabin air loop, at an exterior of the expansion valve or at a desiccant filter.

24. A vehicle system comprising:
  a pressure vessel capsule comprising:
    a superior surface at a first end;
    a structural frame comprising a set of support members extending between the first end and a second end; and
    a set of windows attached to the structural frame, each window extending between a respective pair of adjacent support members of the set, wherein the set of windows and the structural frame cooperatively define a cabin interior which is configured to be fluidly isolated from an exterior environment;
  a set of mounts at the superior surface of the pressure vessel configured to tether a lighter-than-air balloon to the pressure vessel capsule;
  a radiator mounted to the pressure vessel capsule, arranged outside the cabin interior and offset from the superior surface, wherein the radiator comprises a plurality of petals radially encircling a central axis;
  a first heat exchanger mounted within the pressure vessel capsule;
  a cabin air loop, comprising:
    a cabin air manifold fluidly coupled to the first heat exchanger; and
    a fan configured to circulate the cabin air through the cabin air manifold; and
  a first refrigerant loop comprising a refrigerant, the first refrigerant loop fluidly coupled to fluid channels within a first subset of the plurality of petals and configured to thermally couple the first heat exchanger and the radiator; and a second refrigerant loop, fluidly isolated from the first refrigerant loop, which is fluidly coupled to fluid channels within a second subset of the plurality of petals, wherein the first and second subsets are disjoint.

\* \* \* \* \*